US012198268B2

(12) United States Patent
Matsumaru

(10) Patent No.: US 12,198,268 B2
(45) Date of Patent: Jan. 14, 2025

(54) INFORMATION PROCESSING DEVICE

(71) Applicants: PIONEER CORPORATION, Tokyo (JP); PIONEER SMART SENSING INNOVATIONS CORPORATION, Tokyo (JP)

(72) Inventor: Makoto Matsumaru, Kawagoe (JP)

(73) Assignees: PIONEER CORPORATION, Tokyo (JP); PIONEER SMART SENSING INNOVATIONS CORPORATION, Tokyo (JP)

(*) Notice: Subject to any disclaimer, the term of this patent is extended or adjusted under 35 U.S.C. 154(b) by 89 days.

(21) Appl. No.: 17/916,458

(22) PCT Filed: Jan. 22, 2021

(86) PCT No.: PCT/JP2021/002120
§ 371 (c)(1),
(2) Date: Sep. 30, 2022

(87) PCT Pub. No.: WO2021/199606
PCT Pub. Date: Oct. 7, 2021

(65) Prior Publication Data
US 2023/0222728 A1    Jul. 13, 2023

(30) Foreign Application Priority Data
Mar. 31, 2020    (JP) .................. 2020-064256

(51) Int. Cl.
*G06T 17/00*    (2006.01)
*G01S 7/48*    (2006.01)
(Continued)

(52) U.S. Cl.
CPC ............. *G06T 17/00* (2013.01); *G01S 17/88* (2013.01); *G06T 7/20* (2013.01); *G06T 7/60* (2013.01);
(Continued)

(58) Field of Classification Search
CPC .. G06T 17/00; G06T 7/20; G06T 7/60; G06T 7/70; G06T 2207/30252; G01S 17/88; G01S 7/4808; G01S 17/58; G01S 17/89
See application file for complete search history.

(56) References Cited

U.S. PATENT DOCUMENTS 5,708,425 A * 1/1998 Dwyer .................. G08G 1/017
340/928
6,304,321 B1   10/2001 Wangler et al.
(Continued)

FOREIGN PATENT DOCUMENTS

JP    H11185195 A    7/1999
JP    2001319290 A   11/2001
(Continued)

OTHER PUBLICATIONS

Petrovskaya et al—Model based vehicle detection and tracking for autonomous urban driving—2008—Springer Science (Year: 2008).*

(Continued)

*Primary Examiner* — YuJang Tswei
(74) *Attorney, Agent, or Firm* — PROCOPIO, CORY, HARGREAVES & SAVITCH LLP

(57) ABSTRACT

The length of a moving body made of a material that hardly reflects laser light is measured with high accuracy.
First point cloud information based on three-dimensional point cloud information of a first region A1 of a moving body path RW in which a movement direction is set, second point cloud information based on three-dimensional point cloud information of a second region A2, and third point cloud information based on three-dimensional point cloud information of a third region A3 downstream of the second region A2 are acquired in a time series. A velocity VAM of a moving body AM is calculated based on a temporal change of the first point cloud information A1. A front end position (Continued)

FE of the moving body AM at a first time T1 is calculated based on the second point cloud information A2. A rear end position RE of the moving body AM at a second time T2 is calculated based on the third point cloud information A3. A length LAM of the moving body is calculated based on the velocity VAM of the moving body, the front end position FE of the moving body AM at the first time T1, and the rear end position RE of the moving body AM at the second time T2.

2 Claims, 25 Drawing Sheets

(51) Int. Cl.
*G01S 17/58* (2006.01)
*G01S 17/88* (2006.01)
*G01S 17/89* (2020.01)
*G06T 7/20* (2017.01)
*G06T 7/60* (2017.01)
*G06T 7/70* (2017.01)

(52) U.S. Cl.
CPC .............. *G06T 7/70* (2017.01); *G01S 7/4808* (2013.01); *G01S 17/58* (2013.01); *G01S 17/89* (2013.01); *G06T 2207/30252* (2013.01)

(56) References Cited

U.S. PATENT DOCUMENTS

| | | | | |
|---|---|---|---|---|
| 10,242,457 | B1* | 3/2019 | Sibley | .................. H04N 9/3182 |
| 2013/0342822 | A1 | 12/2013 | Shiraishi | |
| 2016/0167580 | A1* | 6/2016 | Hanita | .................... G01S 17/93 |
| | | | | 701/301 |
| 2019/0263344 | A1* | 8/2019 | Yokoi | ................. B60W 30/095 |
| 2019/0353478 | A1* | 11/2019 | Deng | .................... G01S 7/4808 |
| 2020/0012097 | A1* | 1/2020 | Kubota | .................. G02B 27/01 |
| 2020/0284913 | A1* | 9/2020 | Amelot | ................. G01S 7/4808 |
| 2020/0293064 | A1* | 9/2020 | Wu | ....................... G06F 18/214 |
| 2020/0372263 | A1* | 11/2020 | Song | ...................... G06V 20/56 |
| 2021/0063578 | A1* | 3/2021 | Wekel | .................... G01S 17/894 |
| 2021/0109197 | A1* | 4/2021 | O'Keeffe | ............. G01S 7/4816 |
| 2022/0107414 | A1* | 4/2022 | Maheshwari | ........... G01S 7/412 |

FOREIGN PATENT DOCUMENTS

| | | |
|---|---|---|
| JP | 2002251691 A | 9/2002 |
| JP | 2006317304 A | 11/2006 |
| JP | 2016014970 A | 1/2016 |
| JP | 6019866 B2 | 11/2016 |
| JP | 2017146153 A | 8/2017 |
| WO | 03/052457 A2 | 6/2003 |
| WO | 2012117542 A1 | 9/2012 |

OTHER PUBLICATIONS

Kumar et al—LiDAR and Camera Fusion Approach for Object Distance Estimation in Self-Driving Vehicles—Feb. 24, 2020—MPDI (Year: 2020).*

Japanese Patent Office, Notice of Reasons for Refusal, Application No. JP2022-511567, dated Aug. 29, 2023, in 6 pages.

Patent Cooperation Treaty, International Search Report, Application No. PCT/JP2021/002120, dated Jan. 22, 2021, in 4 pages.

European Patent Office, Extended European Search Report, Application No. 21781132.2, dated Mar. 11, 2024, in 9 pages.

* cited by examiner

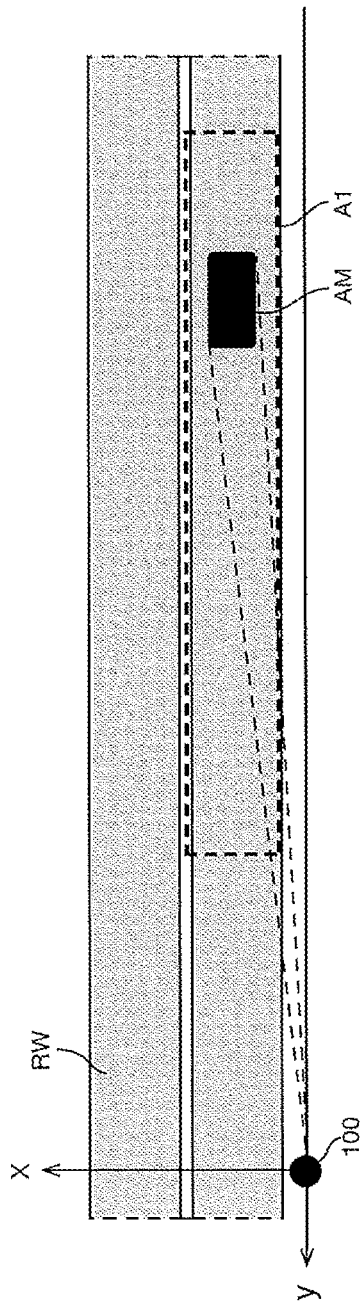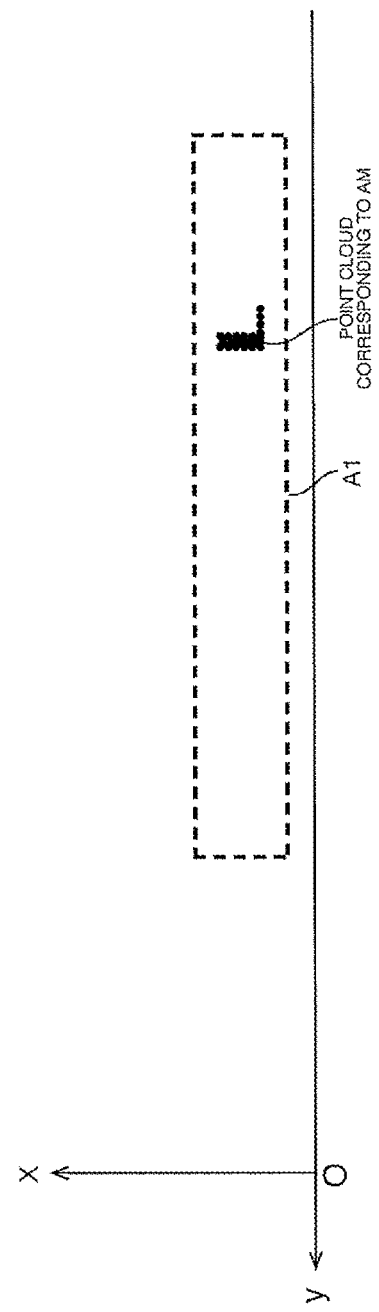
FIG.5A
FIG.5B

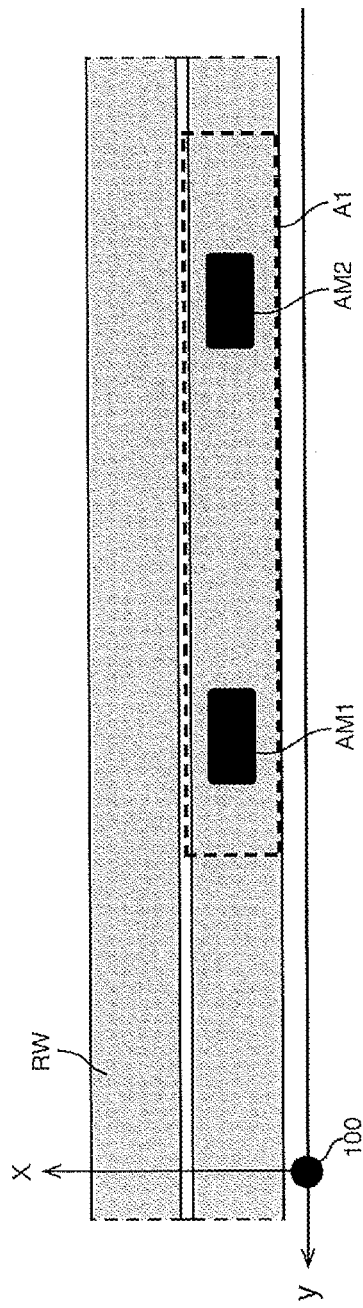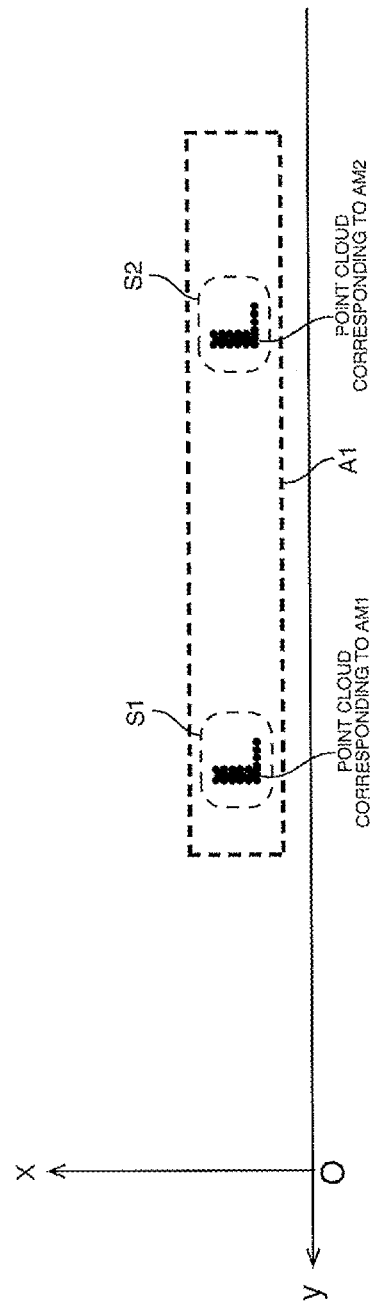
FIG.11A
FIG.11B

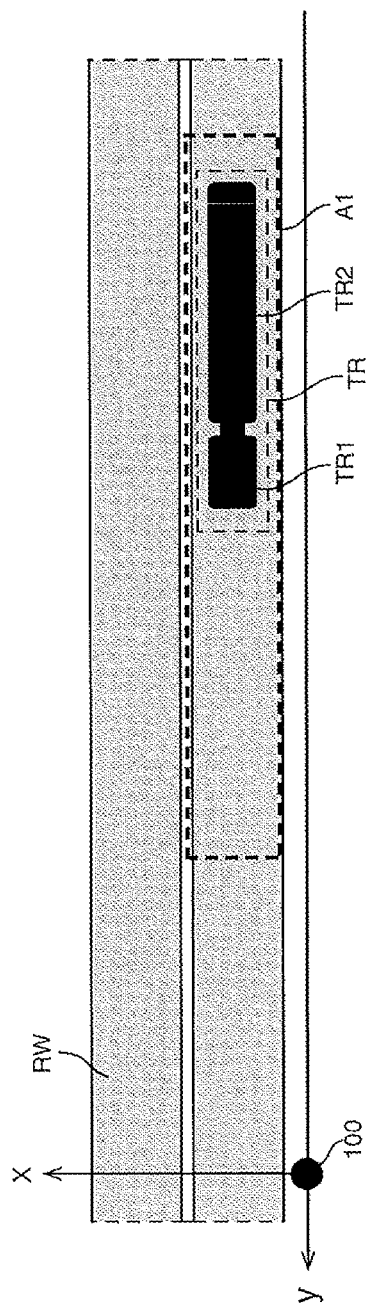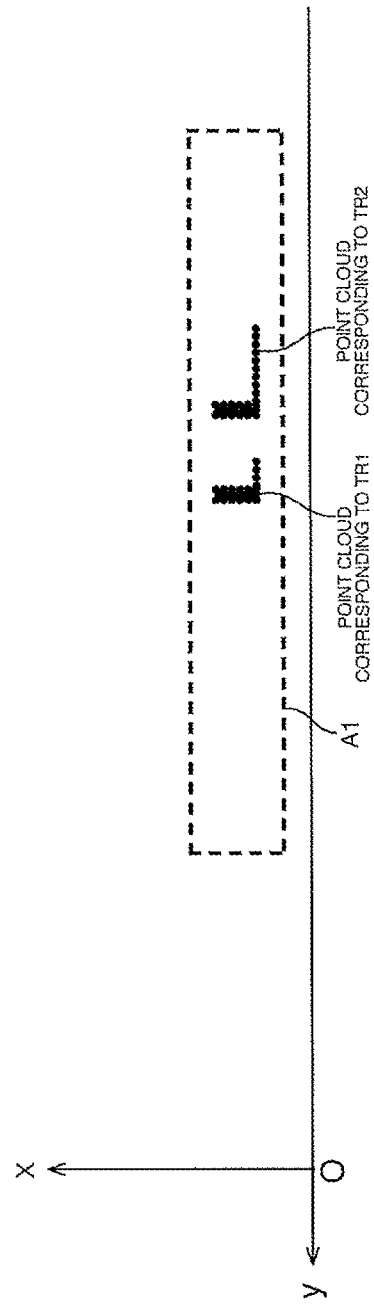
FIG.16A
FIG.16B

INFORMATION PROCESSING DEVICE

TECHNICAL FIELD

The present invention relates to an information processing device.

BACKGROUND ART

Light detection and ranging (LiDAR) (laser imaging detection and ranging) is used to obtain shape information of an object. This device may be referred to as a laser radar or an optical distance measuring sensor. For example, Patent Literature 1 discloses a method of estimating a width and a length of a vehicle based on point cloud information obtained by the LiDAR.

The LiDAR measures a distance to an object by irradiating a detection target space with laser light and receiving reflected light from the object. The LiDAR has a characteristic that, in a case where a divergence angle of the emitted laser light is large, a measurement distance becomes shorter because a reflected component of the laser light decreases. On the other hand, in a case where the divergence angle of the emitted laser light is small, the measurement distance becomes longer because the reflected component of the laser light increases (Patent Literatures 2 and 3).

In addition, the LiDAR obtains shape information of an object in a detection target space by scanning emitted laser light with a MEMS mirror or the like. Patent Literature 4 discloses that a lens is combined with laser light deflected by a MEMS mirror in order to increase an angle of scanning by the MEMS mirror. LiDAR of a type in which a wide-angle lens is combined has a characteristic that a scanning range is wide, but a measurement distance becomes shorter because a divergence angle of laser light becomes large. On the other hand, LiDAR of a type in which a telephoto lens is combined has a characteristic that the scanning range is narrow, but the measurement distance becomes longer because the divergence angle of laser light becomes small.

In some measurement environments, multiple types of LiDAR as described above are combined.

CITATION LIST

Patent Literature

Patent Literature 1: JP 2017-146153 A
Patent Literature 2: JP 2006-317304 A
Patent Literature 3: WO 2012/117542 A
Patent Literature 4: JP 6019866 B2

SUMMARY OF INVENTION

Technical Problem

LiDAR irradiates a detection target space with laser light and receives reflected light of the laser light reflected by a target object to measure a distance to the object in each of a plurality of detection directions, thereby acquiring a shape of the target object. For this reason, in a case where the target object is an object that is difficult to reflect the laser light, such as a black vehicle, distance measurement accuracy of the LiDAR decreases, and the entire shape of the target object cannot be obtained in some cases.

An example of the problem to be solved by the present invention is to measure a length of a moving body that is moving with high accuracy even in a case where a material that hardly reflects laser light is used.

Solution to Problem

In order to solve the above problem, the invention according to claim 1 includes: a point cloud acquisition unit that acquires, in time series, first point cloud information based on three-dimensional point cloud information of a first region of a moving body path in which a movement direction is set, second point cloud information based on three-dimensional point cloud information of a second region of the moving body path, and third point cloud information based on three-dimensional point cloud information of a third region downstream of the second region; a moving body velocity calculation unit that calculates a velocity of a moving body based on a temporal change of the first point cloud information; a front end position calculation unit that calculates a front end position of the moving body at a first time based on the second point cloud information; a rear end position calculation unit that calculates a rear end position of the moving body at a second time based on the third point cloud information; and a moving body length calculation unit that calculates a length of the moving body based on the calculated velocity of the moving body, the calculated front end position of the moving body at the first time, and the calculated rear end position of the moving body at the second time.

The invention according to claim 5 includes: a point cloud acquisition step of acquiring, in time series, first point cloud information based on three-dimensional point cloud information of a first region of a moving body path in which a movement direction is set, second point cloud information based on three-dimensional point cloud information of a second region of the moving body path, and third point cloud information based on three-dimensional point cloud information of a third region downstream of the second region; a moving body velocity calculation step of calculating a velocity of a moving body based on a temporal change of the first point cloud information; a front end position calculation step of calculating a front end position of the moving body at a first time based on the second point cloud information; a rear end position calculation step of calculating a rear end position of the moving body at a second time based on the third point cloud information; and a moving body length calculation step of calculating a length of the moving body based on the calculated velocity of the moving body, the calculated front end position of the moving body at the first time, and the calculated rear end position of the moving body at the second time.

The invention according to claim 6 causes a computer to execute the information processing method according to claim 5.

The invention according to claim 7 stores the information processing program according to claim 6.

BRIEF DESCRIPTION OF DRAWINGS

FIG. 5A is a diagram illustrating an example of a vehicle AM traveling in the first region A1 and a point cloud corresponding to the vehicle AM measured at this time.

FIG. 5B is a diagram illustrating an example of a vehicle AM traveling in the first region A1 and a point cloud corresponding to the vehicle AM measured at this time.

FIG. 11A is a diagram illustrating an example of a case where there are two vehicles in the first region A1.

FIG. 11B is a diagram illustrating an example of a case where there are two vehicles in the first region A1.

FIG. 12 is a diagram illustrating an example of a front end portion region AT.

FIG. 15A is a diagram illustrating an example of a relationship between a point cloud estimated to correspond to the vehicle AM by a segmentation unit 221 and a width WAT of the front end portion region AT.

FIG. 15B is a diagram illustrating an example of a relationship between a point cloud estimated to correspond to the vehicle AM by a segmentation unit 221 and a width WAT of the front end portion region AT.

FIG. 16A is a diagram illustrating an example in which a point cloud corresponding to one vehicle is divided into two segments.

FIG. 16B is a diagram illustrating an example in which a point cloud corresponding to one vehicle is divided into two segments.

DESCRIPTION OF EMBODIMENTS

Figure 1:
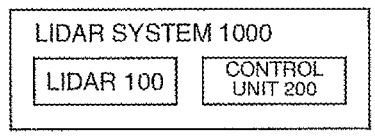
FIG. 1 is a diagram illustrating a light detection and ranging (LiDAR) system 1000 according to an embodiment of the present invention.

An information processing device according to an embodiment of the present invention includes: a point cloud acquisition unit that acquires, in time series, first point cloud information based on three-dimensional point cloud information of a first region of a moving body path in which a movement direction is set, second point cloud information based on three-dimensional point cloud information of a second region of the moving body path, and third point cloud information based on three-dimensional point cloud information of a third region downstream of the second region; a moving body velocity calculation unit that calculates a velocity of a moving body based on a temporal change of the first point cloud information; a front end position calculation unit that calculates a front end position of the moving body at a first time based on the second point cloud information; a rear end position calculation unit that calculates a rear end position of the moving body at a second time based on the third point cloud information; and a moving body length calculation unit that calculates a length of the moving body based on the calculated velocity of the moving body, the calculated front end position of the moving body at the first time, and the calculated rear end position of the moving body at the second time. Therefore, in the present embodiment, it is possible to use two pieces of point cloud information, the second point cloud information including the front surface of the moving body that is traveling and the third point cloud information including the rear surface of the moving body that is traveling to obtain the length of the moving body. As a result, in the present embodiment, even in a case of a moving body that hardly reflects laser light, such as a black vehicle, it is possible to use a point cloud corresponding to a portion that easily reflects laser light, such as a license plate or a bumper arranged on the front surface or the rear surface of the moving body, for detection of the front end position and the rear end position of the moving body, and it is possible to reliably acquire the front end position and the rear end position of the moving body. Therefore, in the present embodiment, even in a case where a material that hardly reflects laser light is used, it is possible to measure the length of a moving body that is moving with high accuracy.

A light detection and ranging (LiDAR) system according to an embodiment of the present invention includes: the information processing device; and LiDAR that generates the three-dimensional point cloud information of the first region, the second region, and the third region. Therefore, in the present embodiment, it is possible to generate the point cloud information for calculating the length of a moving body.

The LiDAR may include: first LiDAR that generates the three-dimensional point cloud information of the first region; second LiDAR that generates the three-dimensional point cloud information of the second region; and third LiDAR that generates the three-dimensional point cloud information of the third region. In this way, it is possible to generate the point cloud information for calculating the length of a moving body by combining LiDAR having a narrow visual field.

The LiDAR may include: first LiDAR that generates the three-dimensional point cloud information of the first region and the second region; and second LiDAR that generates the three-dimensional point cloud information of the third region. In this way, it is possible to generate the point cloud information for calculating the length of a moving body by combining a smaller number of LiDAR having a narrow visual field while keeping the number of LiDARs low.

Furthermore, an information processing method according to an embodiment of the present invention includes: a point cloud acquisition step of acquiring, in time series, first point cloud information based on three-dimensional point cloud information of a first region of a moving body path in which a movement direction is set, second point cloud information based on three-dimensional point cloud information of a second region of the moving body path, and third point cloud information based on three-dimensional point cloud information of a third region downstream of the second region; a moving body velocity calculation step of calculating a velocity of a moving body based on a temporal change of the first point cloud information; a front end position calculation step of calculating a front end position of the moving body at a first time based on the second point cloud information; a rear end position calculation step of calculating a rear end position of the moving body at a second time based on the third point cloud information; and a moving body length calculation step of calculating a length of the moving body based on the calculated velocity of the moving body, the calculated front end position of the moving body at the first time, and the calculated rear end position of the moving body at the second time. Therefore, in the present embodiment, it is possible to use two pieces of point cloud information, the second point cloud information including the front surface of the moving body that is traveling and the third point cloud information including the rear surface of the moving body that is traveling to obtain the length of the moving body. As a result, in the present embodiment, even in a case of a moving body that hardly reflects laser light, such as a black vehicle, it is possible to use a point cloud corresponding to a portion that easily reflects laser light, such as a license plate or a bumper arranged on the front surface or the rear surface of the moving body, for detection of the front end position and the rear end position of the moving body, and it is possible to reliably acquire the front end position and the rear end position of the moving body. Therefore, in the present embodiment, even in a case where a material that hardly reflects laser light is used, it is possible to measure the length of a moving body that is moving with high accuracy.

Furthermore, an information processing program according to an embodiment of the present invention causes a computer to execute the information processing method described above. In this way, it is possible to measure the length of a moving body that is moving with high accuracy by using a computer, the moving body having a low surface reflectance.

In addition, a computer-readable storage medium according to an embodiment of the present invention stores the information processing program described above. In this way, the information processing program described above can be distributed alone in addition to being distributed while being incorporated in a device, and version upgrade or the like can be easily performed.

Embodiment

<LiDAR System 1000>

FIG. 1 is a diagram illustrating a LiDAR system 1000 according to an embodiment of the present invention. The LiDAR system 1000 includes LiDAR 100 and a control unit 200. In the present embodiment, a length of a vehicle is calculated by the control unit 200 based on three-dimensional point cloud information generated by the LiDAR 100.

Figure 2:
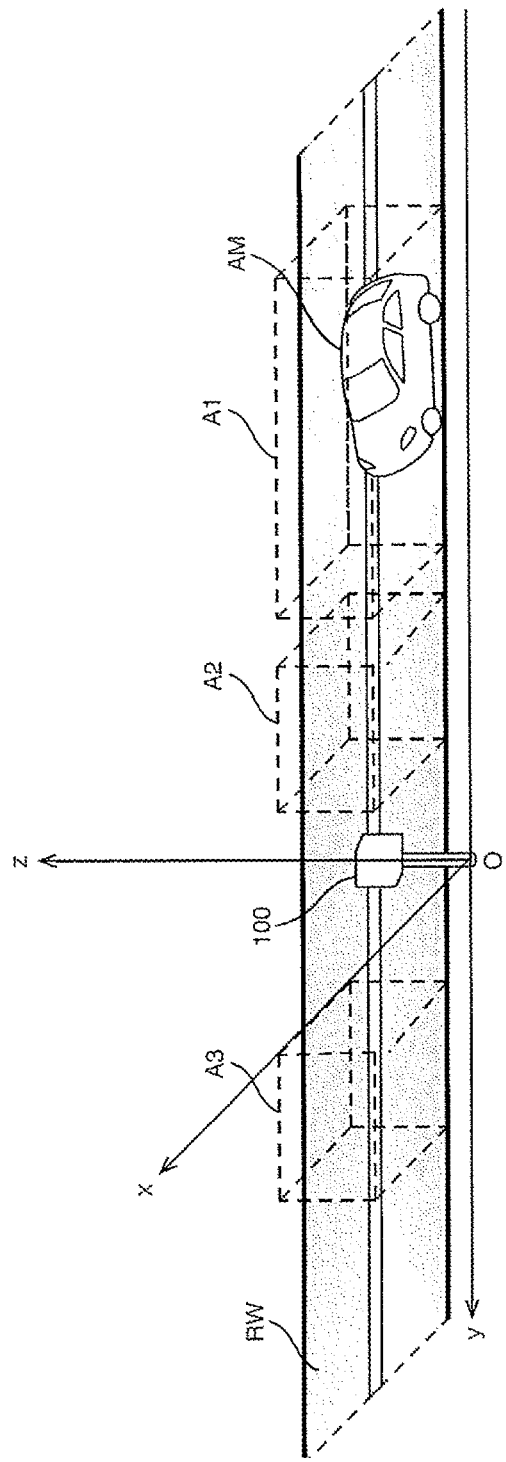
FIG. 2 is a diagram illustrating a relationship between LiDAR 100 and a first region A1, a second region A2, and a third region A3.

The LiDAR 100 generates point cloud information used to calculate a length of a vehicle (moving body) AM traveling in a lane on a front side of a roadway (moving body path) RW. Therefore, for example, the LiDAR 100 is arranged beside the roadway RW as illustrated in FIG. 2, so that three regions of the roadway RW including a first region A1, a second region A2, and a third region A3 can be measured. The LiDAR 100 may be installed above the roadway RW, and may measure three regions from above.

The LiDAR 100 measures three regions of the roadway RW including the first region A1, the region A2, and the region A3, and generates three-dimensional point cloud information of the first region A1, the second region A2, and the third region A3 in time series. That is, the LiDAR 100 measures three regions of the roadway RW including the first region A1, the second region A2, and the third region A3 at a predetermined frame rate, and generates the three-dimensional point cloud information of the first region A1, the second region A2, and the third region A3 at a predetermined frame rate. Therefore, the three-dimensional point cloud information of each of the first region A1, the second region A2, and the third region A3 is constituted by a plurality of frames generated at the predetermined frame rate.

In each frame, each point is represented by orthogonal coordinates (x,y,z). Here, as illustrated in FIG. 2, a position of the LiDAR 100 is an origin O, a width direction of the roadway RW is an x-axis direction, a traveling direction in the lane on the front side of the roadway RW is a y-axis direction, and a direction perpendicular to the width direction of the roadway RW and the traveling direction is a z-axis direction.

As illustrated in FIG. 2, the first region A1 is the most upstream of the three regions in the traveling direction in the lane on the front side of the roadway RW, the second region A2 is downstream of the first region A1, and the third region A3 is downstream of the second region A2. In the example illustrated in FIG. 2, the first region A1 and the second region A2 do not overlap, but the first region A1 and the second region A2 may overlap. In addition, in the example illustrated in FIG. 2, the second region A2 and the third region A3 do not overlap, but the second region A2 and the third region A3 may overlap.

Figure 3:
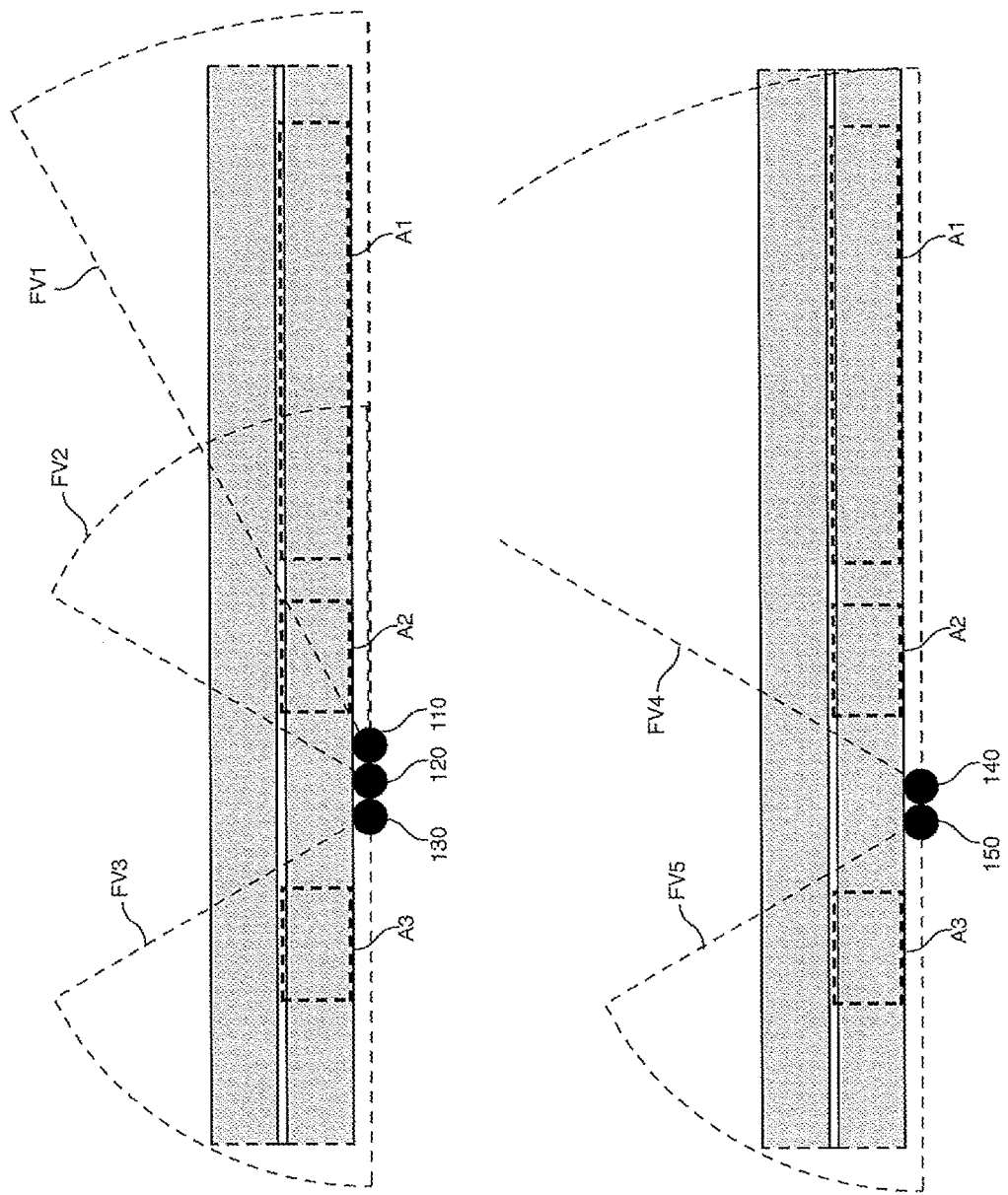
FIG. 3A is a diagram illustrating a relationship between a visual field of the LiDAR 100 and the first region A1, the second region A2, and the third region.
FIG. 3B is a diagram illustrating a relationship between a visual field of the LiDAR 100 and the first region A1, the second region A2, and the third region.

FIGS. 3A and 3B are diagrams illustrating a relationship between a visual field of the LiDAR 100 and the first region A1, the second region A2, and the third region. The LiDAR 100 may include one LiDAR of which a visual field includes all of the first region A1, the second region A2, and the third region. Furthermore, the LiDAR 100 may include, for example, as illustrated in FIG. 3A, three LiDARs: first LiDAR 110 having a visual field FV1 in which the first region A1 is included; second LiDAR 120 having a visual field FV2 in which the second region A2 enters; and third LiDAR 130 having a visual field FV3 in which the third region A3 is included. In addition, the LiDAR 100 may include, for example, as illustrated in FIG. 3B, two LiDARs: fourth LiDAR 140 having a visual field FV4 in which both the first region A1 and the second region A2 are included, and fifth LiDAR 150 having a visual field FV5 in which the third region A3 is included. In a case where the LiDAR 100 includes a plurality of LiDARs, a position where any one of the plurality of LiDARs is arranged may be set as the origin O.

As illustrated in FIG. 2, the first region A1, the second region A2 are upstream of the LiDAR 100, and the third region A3 is downstream of the LiDAR 100. Therefore, the LiDAR 100 can measure a front surface (a hood, a windshield, or the like) and a side surface (a side on which the LiDAR 100 is arranged) of the vehicle AM traveling in the first region A1 and the second region A2, and can measure a rear surface and the side surface (the side on which the LiDAR 100 is arranged) of the vehicle AM traveling in the third region A3.

Figure 4:
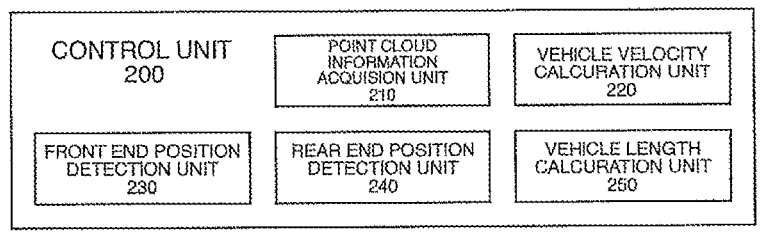
FIG. 4 is a diagram illustrating a control unit 200 according to an embodiment of the present invention.

FIG. 4 is a diagram illustrating the control unit 200 according to an embodiment of the present invention. The control unit 200 includes a point cloud information acquisition unit 210, a vehicle velocity calculation unit (moving body velocity calculation unit) 220, a front end position detection unit 230, a rear end position detection unit 240, and a vehicle length calculation unit 250. The control unit 200 is implemented by, for example, a computer including a central processing unit (CPU) and the like.

The point cloud information acquisition unit 210 acquires first point cloud information based on the three-dimensional point cloud information of the first region A1 generated by the LiDAR 100, second point cloud information based on the three-dimensional information of the second region A2 generated by the LiDAR 100, and third point cloud information based on the three-dimensional information of the third region A3 generated by the LiDAR 100.

In the present embodiment, the control unit 200 calculates the length of the vehicle. Therefore, it is sufficient that the control unit 200 can acquire at least information regarding a length direction of the vehicle, that is, the traveling direction (y-axis direction) of the vehicle. Therefore, the first point cloud information may be the three-dimensional point cloud information itself of the first region A1 generated by the LiDAR, may be one-dimensional point cloud information (a y coordinate value of each point) of the three-dimensional point cloud information, or may be two-dimensional point cloud information (an x coordinate value and the y coordinate value of each point). Similarly, the second point cloud information (third point cloud information) may be the three-dimensional point cloud information itself of the second region A2 (third region A3) generated by the LiDAR, may be one-dimensional point cloud information (a y coordinate value of each point) of the three-dimensional point cloud information, or may be two-dimensional point cloud information (an x coordinate value and the y coordinate value of each point).

In the present embodiment, the control unit 200 calculates a length LAM of the vehicle AM traveling on the roadway RW based on the three pieces of point cloud information acquired by the point cloud information acquisition unit 210. Specifically, a velocity VAM of the vehicle AM is calculated based on information when the vehicle AM is traveling in the first region A1 (first point cloud information), a front end position FE of the vehicle AM at a first time T1 is calculated based on information when the vehicle AM is traveling in the second region A2 (second point cloud information), a rear end position RE of the vehicle AM at a second time T2 is calculated based on information when the vehicle AM is traveling in the third region A3 (third point cloud information), and the length LAM of the vehicle AM is calculated based on the calculated velocity VAM of the vehicle AM, the calculated front end position FE of the vehicle AM at the first time T1, and the calculated rear end position RE of the vehicle AM at the second time T2.

The vehicle velocity calculation unit 220 calculates the velocity VAM of the vehicle AM based on a temporal change of the first point cloud information. FIG. 5A is a diagram illustrating the vehicle AM traveling in the first region A1, and FIG. 5B is a diagram illustrating a point cloud corresponding to the vehicle AM measured at this time. The first region A1 is upstream of the LiDAR 100, as illustrated in FIGS. 2 and 5. Therefore, as illustrated in FIG. 5A, the front surface (the hood, the windshield, or the like) and the side surface (the side on which the LiDAR 100 is arranged) of the vehicle AM traveling in the first region A1 can be seen from the LiDAR 100, and point cloud data corresponding to the front surface and the side surface of the vehicle AM is acquired as the first point cloud information, for example, as illustrated in FIG. 5B. Therefore, the vehicle velocity calculation unit 220 calculates the velocity VAM of the vehicle AM by detecting movement of the front end position FE of the vehicle AM by using this point cloud, for example. In addition, since the first region A1 is wide in a direction in which the vehicle moves, the point cloud information for a relatively long period is acquired. Therefore, the vehicle velocity calculation unit 220 may improve accuracy in calculating the velocity VAM by using the Kalman filter or the like for time-series data of a plurality of frames.

Figure 6A:
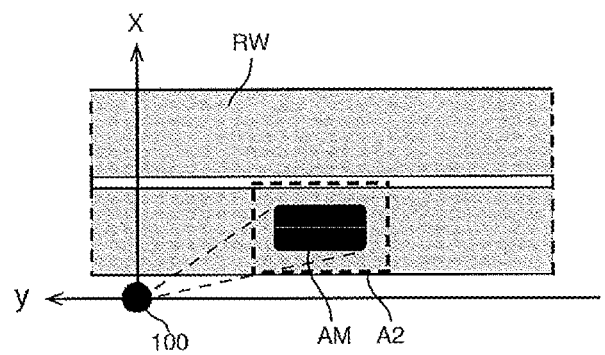
FIG. 6A is a diagram illustrating an example of the vehicle AM traveling in the second region A2 and a point cloud corresponding to the vehicle AM measured at this time.
Figure 6B:
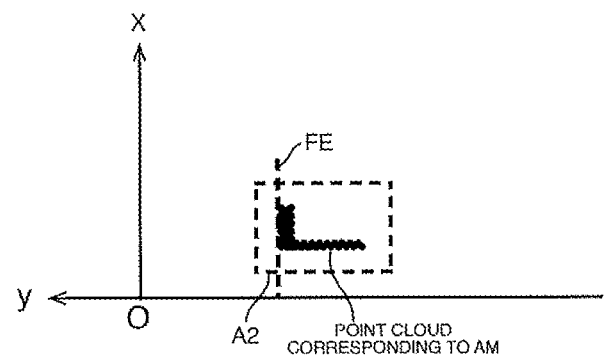
FIG. 6B is a diagram illustrating an example of the vehicle AM traveling in the second region A2 and a point cloud corresponding to the vehicle AM measured at this time.

The front end position detection unit 230 calculates the front end position FE of the vehicle AM at the first time T1 based on the second point cloud information. FIG. 6A is a diagram illustrating the vehicle AM traveling in the second region A2, and FIG. 6B is a diagram illustrating a point cloud corresponding to the vehicle AM measured at this time. The second region A2 is upstream of the LiDAR 100, as illustrated in FIG. 2. Therefore, as illustrated in FIG. 6A, the front surface (the hood, the windshield, or the like) and the side surface (the side on which the LiDAR 100 is arranged) of the vehicle AM traveling in the second region A2 are seen from the LiDAR 100, and as illustrated in FIG. 6B, for example, point cloud data corresponding to the front surface and the side surface of the vehicle AM is acquired. Therefore, for example, the front end position detection unit 230 obtains the front end position FE of the vehicle AM at the first time T1 by detecting a point corresponding to the front end position FE of the vehicle AM in a frame of the first time T1 in the second point cloud information. In addition, since the second region A2 is narrow in the direction in which the vehicle moves, the point cloud information for a relatively short period is acquired. Therefore, the front end position detection unit 230 may improve the accuracy of the front end position FE by calculating an average value of pieces of time information (T11, T12, and T13) and the front end positions (FE1, FE2, and FE3) of time-series data of a plurality of frames (for example, three frames).

Figure 7A:
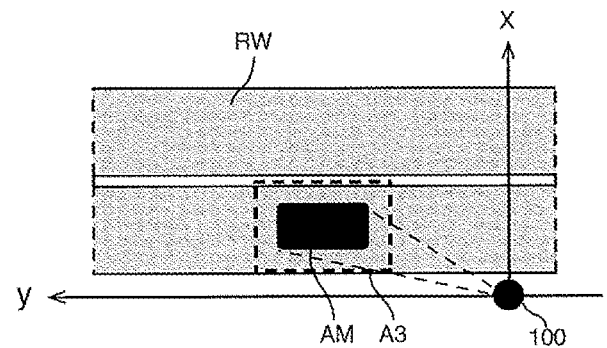
FIG. 7A is a diagram illustrating an example of the vehicle AM traveling in the third region A3 and a point cloud corresponding to the vehicle AM measured at this time.
Figure 7B:
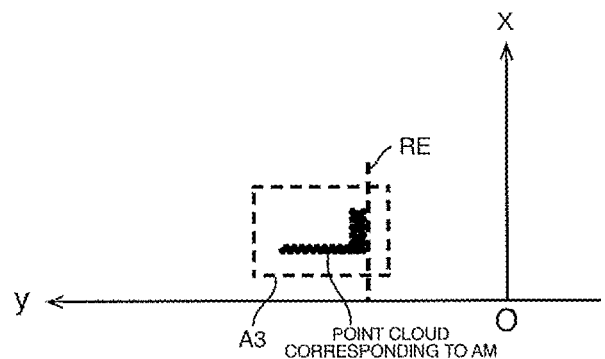
FIG. 7B is a diagram illustrating an example of the vehicle AM traveling in the third region A3 and a point cloud corresponding to the vehicle AM measured at this time.

The rear end position detection unit 240 calculates the rear end position RE of the vehicle at the second time based on the third point cloud information. FIG. 7A is a diagram illustrating the vehicle AM traveling in the third region A3, and FIG. 7B is a diagram illustrating a point cloud corresponding to the vehicle AM measured at this time. The third region A3 is downstream of the LiDAR 100, as illustrated in FIG. 2. Therefore, as illustrated in FIG. 7A, the rear surface and the side surface of the vehicle AM traveling in the third region A3 can be seen from the LiDAR 100, and point cloud data corresponding to the rear surface and the side surface of the vehicle AM is acquired as the third point cloud information, for example, as illustrated in FIG. 7B. Therefore, for example, the rear end position detection unit 240 obtains the front end position RE of the vehicle AM at the second time T2 by detecting a point corresponding to the rear end position RE of the vehicle AM in a frame at the second time T2 in the third point cloud information. In addition, since the third region A3 is narrow in the direction in which the vehicle moves, the point cloud information for a relatively short period is acquired. Therefore, the rear end position detection unit 240 may improve the accuracy of the rear end position RE by calculating an average value of pieces of time information (T21, T22, and T23) and the rear end positions (RE1, RE2, and RE3) of time-series data of a plurality of frames (for example, three frames).

Figure 8A:
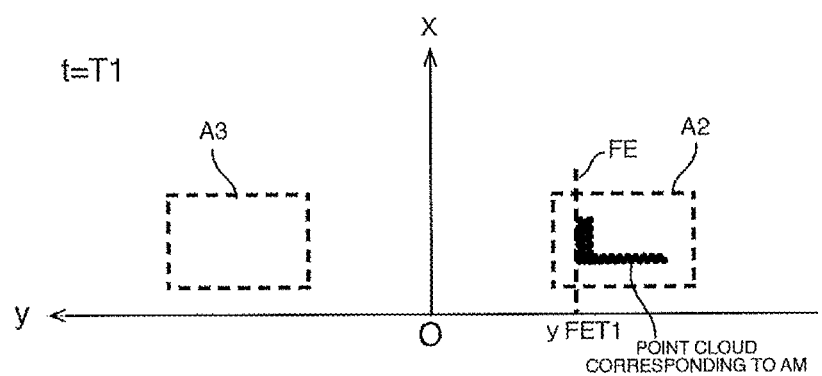
FIG. 8A is a diagram illustrating an example of calculation of a length LAM of the vehicle.
Figure 8B:
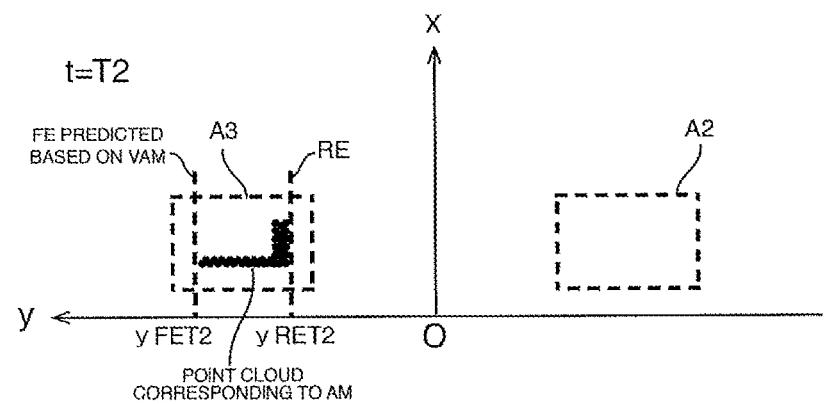
FIG. 8B is a diagram illustrating an example of calculation of a length LAM of the vehicle.

The vehicle length calculation unit 250 calculates the length LAM of the vehicle AM based on the velocity VAM of the vehicle AM, the front end position FE of the vehicle AM at the first time T1, and the rear end position RE of the vehicle AM at the second time T2. For example, in a case where the y coordinate of the front end position FE at the first time T1 calculated by the front end position detection unit 230 is yFET1 (FIG. 8A), if the vehicle AM is traveling at the velocity VAM of the vehicle AM calculated by the vehicle velocity calculation unit 220 between the first time T1 and the second time T2, it is estimated that the y coordinate of the front end position FE of the vehicle AM at the second time T2 is yFET2=yFET1+VAM(T2−T1) (FIG. 8B). Therefore, in a case where the y coordinate of the rear end position RE at the second time T2 calculated by the rear end position detection unit 240 is yRET2, the length LAM of the vehicle AM can be calculated as, for example, LAM=yFET2−yRET2=yFET1−yRET2+VAM (T2−T1).

As described above, in the present embodiment, two pieces of point cloud information including the second point cloud information including the front surface of the vehicle that is traveling and the third point cloud information including the rear surface of the vehicle that is traveling are used to obtain the length of the vehicle. As a result, in the present embodiment, even in a case of a black vehicle that hardly reflects laser light, it is possible to use a point cloud corresponding to a portion that easily reflects laser light, such as a license plate or a bumper arranged on the front surface or the rear surface of the vehicle, and it is possible to reliably acquire the front end position and the rear end position of the vehicle. Therefore, in the present embodiment, it is possible to measure the length of a moving vehicle such as a black vehicle that hardly reflects laser light, with high accuracy.

Figure 9:
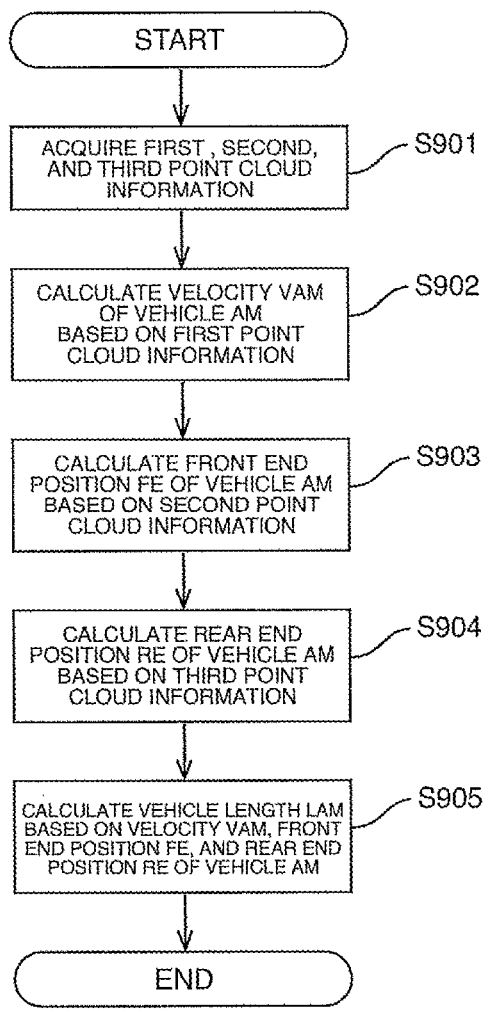
FIG. 9 is a diagram illustrating an example of a processing operation in a control unit 120 according to an embodiment of the present invention.

FIG. 9 is a diagram illustrating an example of a processing operation in the control unit 120 according to an embodiment of the present invention. The point cloud information acquisition unit 210 acquires the first point cloud information based on the three-dimensional information of the first region A1 of the roadway RW, the second point cloud information based on the three-dimensional information of the second region A2, and the third point cloud information based on the three-dimensional information of the third region A3 (Step S901). The velocity calculation unit 210 calculates the velocity VAM of the vehicle AM based on the temporal change of the first point cloud information (Step S902). The front end position detection unit 230 calculates the front end position FE of the vehicle AM at the first time T1 based on the second point cloud information (Step S903). The rear end position detection unit 240 calculates the rear end position RE of the vehicle AM at the second time T2 based on the third point cloud information (Step S904). The vehicle length calculation unit 250 calculates the length LAM of the vehicle AM based on the velocity VAM of the vehicle AM, the front end position FE of the vehicle AM at the first time T1, and the rear end position RE of the vehicle AM at the second time T2 (Step S905).

<Calculation of Velocity VAM of Vehicle>

Figure 10:
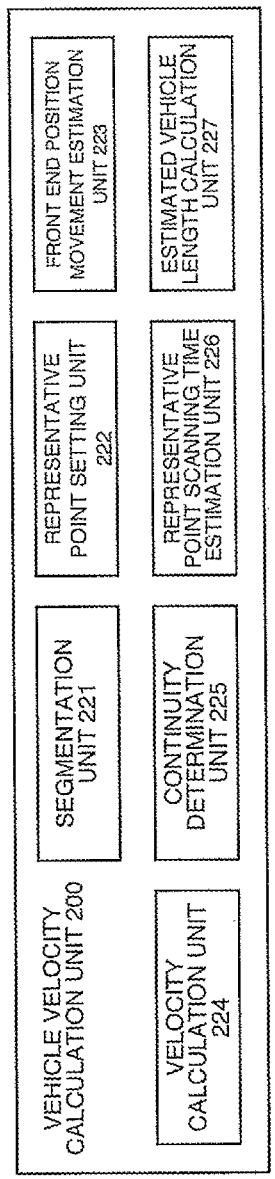
FIG. 10 is a diagram illustrating a vehicle velocity calculation unit 220 of the control unit 200 according to an embodiment of the present invention.

FIG. 10 is a diagram illustrating the vehicle velocity calculation unit 220 of the control unit 200 according to an embodiment of the present invention. The vehicle velocity calculation unit 220 includes a segmentation unit 221, a representative point setting unit 222, a front end position movement estimation unit 223, and a velocity calculation unit 224.

The segmentation unit 221 estimates a point cloud corresponding to the same vehicle based on a distance between two points in each frame of the first point cloud information.

Each frame of the first point cloud information may include a plurality of vehicles. FIG. 11 is a diagram illustrating an example of a case where there are two vehicles in the first region A1. In a case where two vehicles (a vehicle AM1 and a vehicle AM2) are traveling in the first region A1 as illustrated in FIG. 11A, a cluster of two point clouds is included in the first point cloud information as illustrated in FIG. 11B.

Therefore, for each frame of the first point cloud information, the segmentation unit 221 segments points of the frame into point clouds (segments) estimated to correspond to the same vehicle. In the example illustrated in FIG. 11B, the segmentation unit 221 segments points of a frame into two segments, a segment S1 corresponding to the vehicle AM1 and a segment S2 corresponding to the vehicle AM2.

At this time, the segmentation unit 221 segments the points of the frame into a plurality of segments based on a distance between two points. Specifically, the segmentation unit 221 segments points of a frame in such a way that two points whose distance therebetween is equal to or less than a first distance (for example, 1 m or 1.5 m) are included in the same segment in each frame. The distance between two points (P1 $(x1,y1,z1)$ and P2 $(x2,y2,z2)$) may be a three-dimensional distance $(((x1-x2)^2+(y1-y2)^2+(z1-z2)^2)^{1/2})$, a two-dimensional distance $(((x1-x2)^2+(y1-y2)^2)^{1/2})$, or a one-dimensional distance $(|y1-y2|)$.

For each frame of the first point cloud information, the representative point setting unit 222 extracts a point cloud of a front end portion region from each of point clouds (segments) estimated to correspond to the same vehicle, and sets a representative point based on the extracted point cloud.

There is a high possibility that the foremost point (a point having the largest y coordinate value) of each segment obtained by segmenting the points by the segmentation unit 221 indicates the front end position of the vehicle corresponding to the segment. Thus, for example, it is possible to detect this foremost point of a segment in each frame and to obtain the velocity of the vehicle corresponding to this segment based on a temporal change of the detected foremost point, that is, movement of the foremost point.

However, there is a possibility that accuracy in measuring the foremost point is poor. Therefore, in the present embodiment, the representative point setting unit 222 sets a representative point representing a segment for each segment, and calculates the velocity of the vehicle corresponding to each segment based on movement of the representative point instead of the movement of the foremost point.

Figure 12:
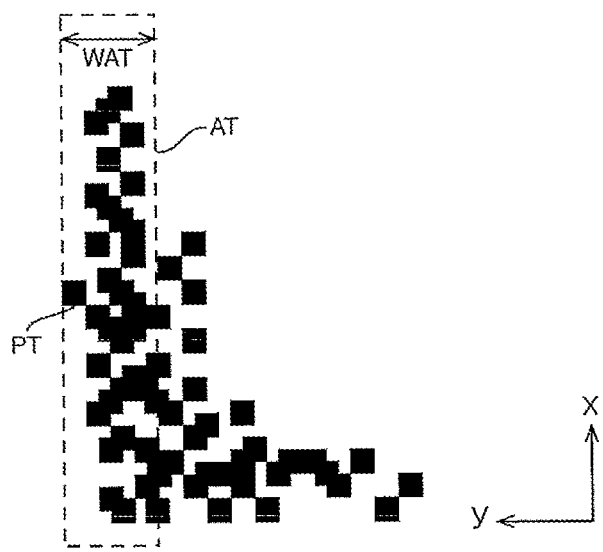

At this time, in the present embodiment, as illustrated in FIG. 12, the representative point setting unit 222 sets a region (front end portion region AT) extending rearward from a front end point PT, which is the foremost point, for each segment. That is, in a case where the y coordinate of the front end point is yPT, the representative point setting unit 222 sets a region determined by yPT−WAT≤y≤yPT as the front end portion region AT. At this time, the front end portion region AT is a region having a width WAT in the y-axis direction. The width WAT may be, for example, 10 cm to 1 m.

Then, the representative point setting unit 222 calculates an average value of the y coordinates of the points in the front end portion region AT and sets the average value as the representative point. That is, in the present embodiment, the representative point is set only by the y coordinate values of the points in the front end portion region AT, and the representative point has only the y coordinate value. For example, in a case where n points: P1 $(x1,y1,z1)$, P2 $(x2,y2,z2)$, P3 $(x3,y3,z3)$, . . . , and Pn $(xn,yn,zn)$ are included in the front end portion region AT, the y coordinate of the representative point is $(y1+y2+y3+ \ldots +yn)/n$.

The front end position movement estimation unit 223 calculates an estimated front end position, which is an estimated value of the front end position of the vehicle, based on the representative point set by the representative point setting unit 222. At this time, the y coordinate value of the representative point may be simply set as the estimated front end position which is an estimated value of the front end position of the vehicle. Further, the front end position movement estimation unit 223 may calculate movement of the estimated front end position, which is an estimated value of the front end position of the vehicle, by applying the Kalman filter to the y coordinate value of the representative point. That is, the front end position movement estimation unit 223 may estimate the front end position of the vehicle by using the Kalman filter (that is, calculating the estimated front end position) with the y coordinate value of the representative point as an observation value of the front end position of the vehicle in each frame. At this time, in the present embodiment, since the representative point has only the y coordinate value, the estimated front end position is also a position determined only by the y coordinate value.

Figure 13:
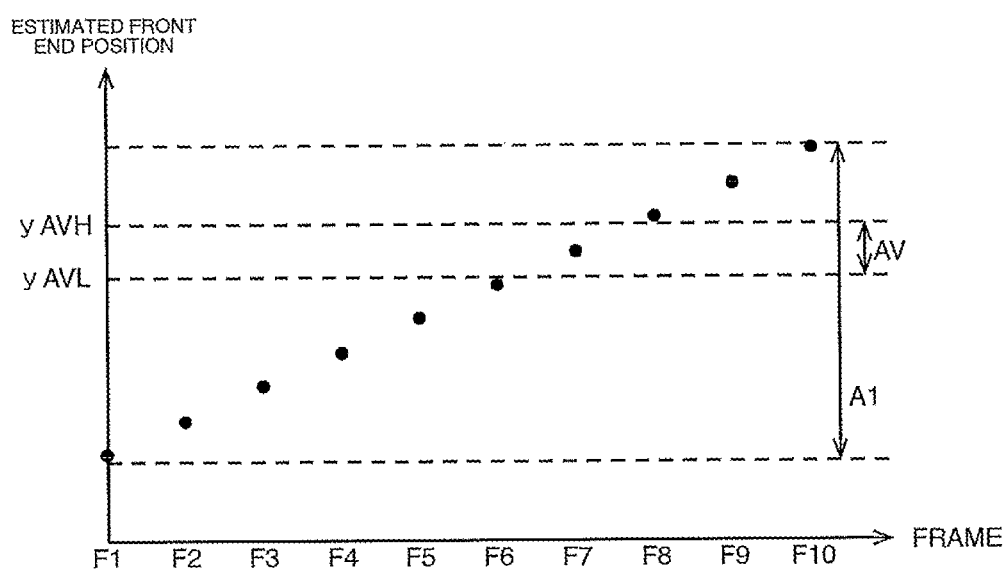
FIG. 13 is a diagram illustrating an example of movement of an estimated front end position.

As described above, in the present embodiment, for each frame, the segmentation unit 221 segments points of a frame into point clouds (segments) corresponding to the same vehicle, the representative point setting unit 222 sets the representative point for each segment, and the estimated front end position is calculated for each segment by the front end position movement estimation unit 223 based on the set representative point. As illustrated in FIG. 13, the estimated front end position (that is, the y coordinate value) calculated in this manner moves every time the frame advances, that is, as time passes. FIG. 13 illustrates an example of a change of the estimated front end position corresponding to the vehicle in a case where the front end of the vehicle enters the first region A1 in a frame F1 and leaves the first region A1 after a frame F6. In the present embodiment, the movement of the vehicle corresponding to the estimated front end position is observed by observing how the estimated front end position moves.

When the estimated front end position has reached a velocity calculation region AV set in the first region A1, the velocity calculation unit 224 calculates the velocity of the vehicle corresponding to the estimated front end position based on the movement of the estimated front end position. The velocity calculation region AV is set as, for example, a region determined by yAVL≤y≤yAVH. That is, when the value of the estimated front end position exceeds yAVL, the velocity calculation unit 224 calculates the velocity of the vehicle corresponding to the estimated front end position based on the movement of the estimated front end position.

In the calculation of the velocity of the vehicle, movement of the estimated front end position between two frames may be used, or movement between a plurality of frames may be used. In the example illustrated in FIG. 13, since the estimated front end position reaches the velocity calculation region AV in a frame F7, the velocity of the vehicle is calculated when the estimated front end position for the frame F7 has been calculated. Therefore, in the example illustrated in FIG. 13, for example, the velocity of the vehicle may be calculated based on movement of the estimated front end position between a frame (frame F7) when the vehicle has reached the velocity calculation region AV and a frame (frame F6) immediately before the frame, or the velocity of the vehicle may be calculated based on movement of the estimated front end position between frames (frames F1 to F7) from when the front end of the vehicle enters the vehicle A1 to when the front end of the vehicle leaves the vehicle A1. Alternatively, in the Kalman filter processing described above, since the movement velocity is also calculated at the same time as the estimation of the front end position, the velocity value calculated by the Kalman filter may be used.

Figure 14:
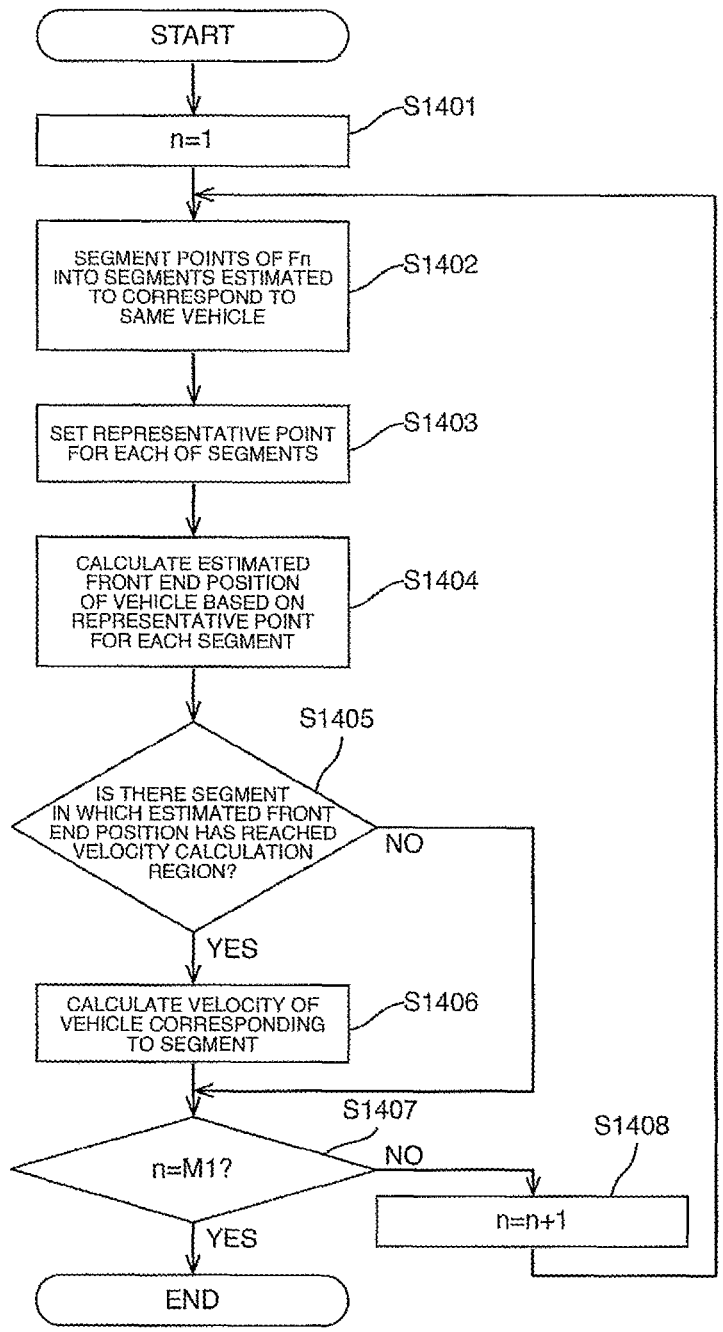
FIG. 14 is a diagram illustrating an example of a processing operation in the vehicle velocity calculation unit 220 according to an embodiment of the present invention.

FIG. 14 is a diagram illustrating an example of a processing operation in the vehicle velocity calculation unit 220 according to the present embodiment. In FIG. 14, it is assumed that the first point cloud information includes M1 frames Fn (n=1, 2, 3, . . . , M1). The vehicle velocity calculation unit 220 sets n=1 (Step S1401). The segmentation unit 221 segments points of the frame Fn into point clouds (segments) estimated to correspond to the same vehicle (Step S1402). The representative point setting unit 222 sets the representative point for each of the point clouds (segments) estimated to correspond to the same vehicle (Step S1403). For each of the point clouds (segments) estimated to correspond to the same vehicle, the front end position movement estimation unit 223 calculates the estimated front end position which is an estimated value of the front end position of the vehicle corresponding based on the set representative point (Step S1404).

If there is a segment in which the estimated front end position has reached the velocity calculation region AV in the frame Fn (YES in Step S1405), the velocity calculation unit 224 calculates the velocity of the vehicle corresponding to the segment in which the estimated front end position has reached the velocity calculation region AV (Step S1406), and checks whether or not n=M1 (Step S1407). If n=M1 (YES in Step S507), the vehicle velocity calculation unit 220 ends the processing. If n is not M1 (NO in Step S1407), the vehicle velocity calculation unit 220 sets n=n+1 (Step S1408), and the processing returns to Step S1402.

If there is no segment in which the estimated front end position has reached the velocity calculation region AV in the frame Fn (NO in Step S1405), the vehicle velocity calculation unit 220 checks whether or not n=M1 (Step S1407).

<Size of Front End Portion Region>

Figure 15A:
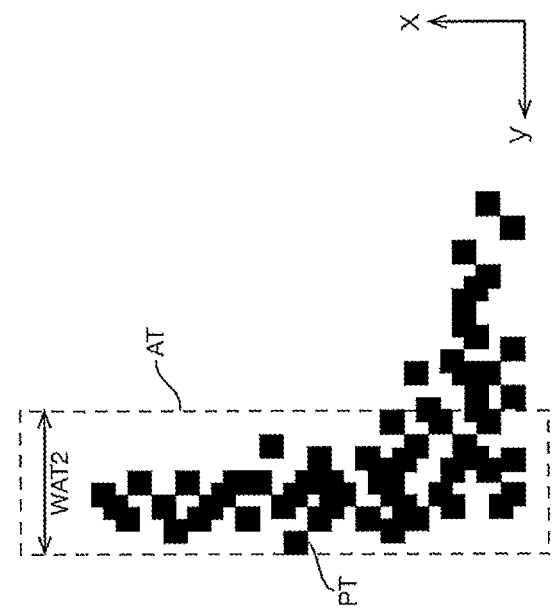
Figure 15B:
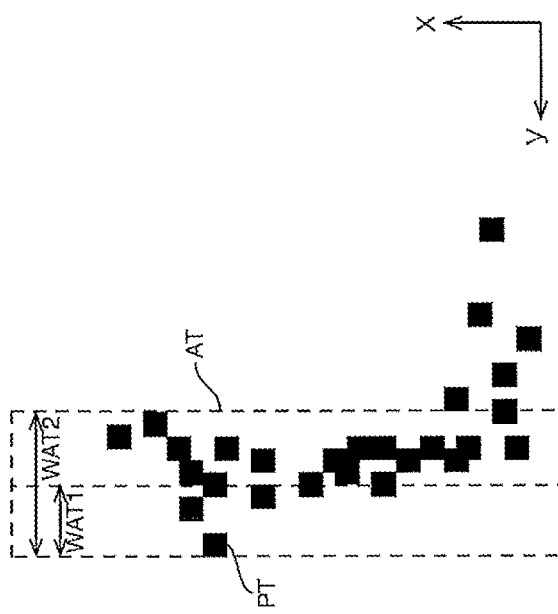

In the above embodiment, the representative point setting unit 222 sets the representative point based on the point cloud of the front end portion region AT. As illustrated in FIG. 15, a point cloud (FIG. 15A) estimated by the segmentation unit 221 to correspond to the vehicle AM when the vehicle AM is far from the LiDAR 100 has a smaller number of points than a point cloud (FIG. 15B) estimated by the segmentation unit 221 to correspond to the vehicle AM when the vehicle AM is near the LiDAR 100. Therefore, if a small width WTA1 is used as the width WAT of the front end portion region AT in the y direction when the vehicle AM is far from the LiDAR 100, the number of points included in the front end region AT decreases. Additionally, the distance measurement accuracy tends to be worse at a far point than at a near point. As a result, an influence of noise may increase. Therefore, the width WAT of the front end portion region AT in the y direction when the vehicle AM is far from the LiDAR 100 needs to be increased to some extent, like a width WTA2 in FIG. 15A. However, if the width WAT2 used when the vehicle AM is far from the LiDAR 100 is used as the width WAT of the front end portion region AT in the y direction even when the vehicle AM is near the LiDAR 100, the front end portion region AT includes not only a point of the front surface of the vehicle AM but also a point of the side surface of the vehicle AM. In such a case, the representative point that is the average of the y coordinate values of the points included in the front end portion region AT is smaller than the y coordinate value of the actual front end position. Therefore, the estimated front end position estimated based on the representative value is located behind the actual front end position. As a result, in a case where the front end position is estimated using this representative point and the velocity VAM of the vehicle AM is calculated, the calculated velocity VAM is lower than the actual velocity of the vehicle AM.

Therefore, the representative point setting unit 222 according to an embodiment of the present invention sets the width WAT of the front end portion region AT in the y direction to be smaller as the vehicle AM approaches the LiDAR 100. At this time, the representative point setting unit 222 sets the width WAT of the front end portion region AT in the y direction based on a distance between the LiDAR 100 and the vehicle AM, for example. That is, for example, the representative point setting unit 222 sets the width WAT of the front end portion region AT in the y direction to be smaller as the distance between the LiDAR 100 and the vehicle AM decreases.

For example, the representative point setting unit 222 may calculate the distance between the LiDAR 100 and the vehicle AM in each frame Fn by using the estimated front end position with respect to a segment corresponding to the vehicle AM in the immediately previous frame Fn−1. That is, for example, the representative point setting unit 222 may set the width WAT of the front end portion region AT in the y direction in each frame Fn to be smaller as a distance DAM between the estimated front end position of the immediately previous frame Fn−1 and the origin O decreases.

At this time, the width WAT may change continuously or discontinuously with respect to the distance DAM. For example, a plurality of threshold values may be prepared for the distance DAM, and the width WAT may change every time the distance DAM falls below the threshold value. In particular, two threshold values (a first threshold value (for example, 25 m) and a second threshold value (for example, 17 m)) are prepared. When the distance DAM is equal to or larger than the first threshold value, the width WAT is set to a first width (for example, 60 cm). When the distance DAM is smaller than the first threshold value and equal to or larger than the second threshold value, the width WAT is set to a second width (for example, 30 cm). When the distance DAM is smaller than the second threshold value, the width WAT is set to a third width (for example, 15 cm).

<Continuity of Point Cloud>

The segmentation unit 221 segments points of a frame in such a way that two points whose distance therebetween is equal to or less than the first distance are included in the same segment in each frame. Then, in order to prevent points corresponding to different vehicles from being included in the same segment, the first distance needs to be set to a small value. However, in a case where the first distance is excessively small, points actually corresponding to the same vehicle may be separated into two different segments. For example, in a case where the vehicle is a semi-trailer TR in which a tractor TR1 tows a trailer TR2 as illustrated in FIG. 16A, a point cloud of a front surface and a side surface of each of the tractor TR1 and the trailer TR2 appears as illustrated in FIG. 16B, and thus one semi-tractor may be separated into two segments (a segment corresponding to the tractor TR1 and a segment corresponding to the trailer TR2).

Therefore, the vehicle velocity calculation unit 220 according to an embodiment of the present invention further includes a continuity determination unit 225. The continuity determination unit 225 determines continuity of the points of the first point cloud information based on a temporal change of a point cloud included in a continuity determination region AC set in the first region A1. The continuity determination region AC is set as, for example, a region determined by $yACL \leq y \leq yACH$.

Figure 17B:
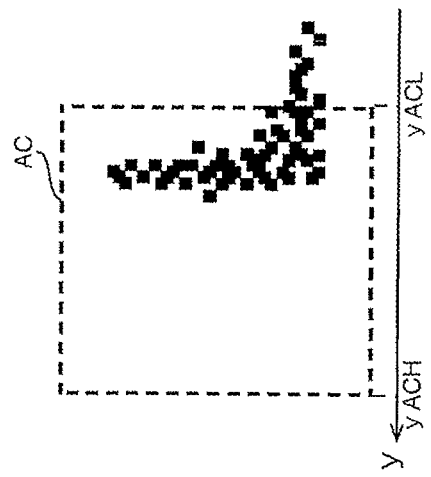
FIG. 17B is a diagram illustrating a relationship between a point cloud and a continuity determination region AC.
Figure 17A:
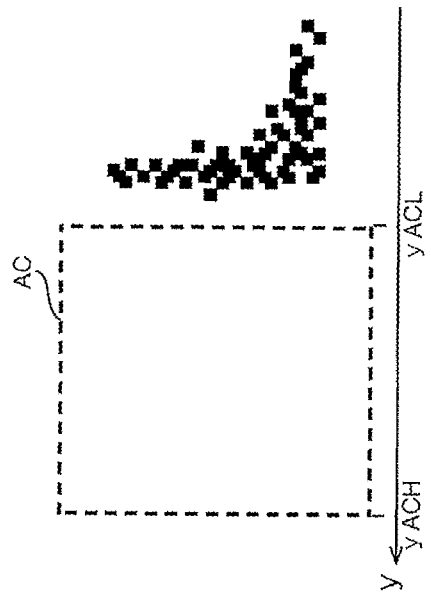
FIG. 17A is a diagram illustrating a relationship between a point cloud and a continuity determination region AC.
Figure 18A:
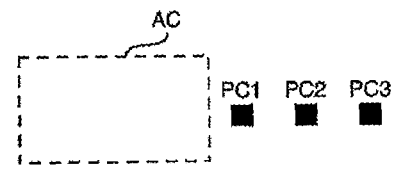
FIG. 18A is a diagram illustrating an example of a relationship between movement of a point cloud and the continuity determination region AC.
Figure 18B:
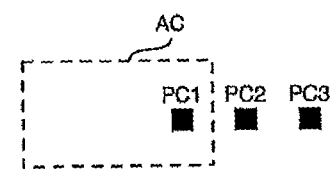
FIG. 18B is a diagram illustrating an example of a relationship between movement of a point cloud and the continuity determination region AC.
Figure 18C:
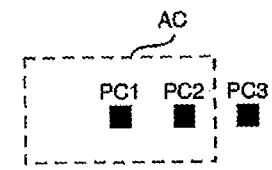
FIG. 18C is a diagram illustrating an example of a relationship between movement of a point cloud and the continuity determination region AC.
Figure 18D:
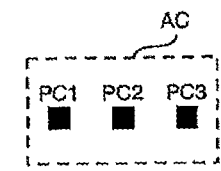
FIG. 18D is a diagram illustrating an example of a relationship between movement of a point cloud and the continuity determination region AC.
Figure 18E:
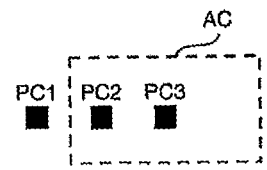
FIG. 18E is a diagram illustrating an example of a relationship between movement of a point cloud and the continuity determination region AC.
Figure 18F:
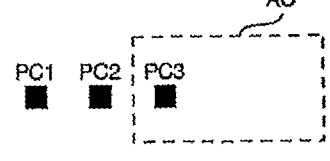
FIG. 18F is a diagram illustrating an example of a relationship between movement of a point cloud and the continuity determination region AC.
Figure 18G:
FIG. 18G is a diagram illustrating an example of a relationship between movement of a point cloud and the continuity determination region AC.

For example, the continuity determination unit 225 may store a continuity state indicating continuity of the points of the first point cloud information in the continuity determination region AC. For example, when no point is included in the continuity determination region AC as illustrated in FIG. 17A, the continuity determination unit 225 stores the continuity state of the frame as "OFF", and when the points are included in the continuity determination region AC as illustrated in FIG. 17B, the continuity determination unit 225 stores the continuity state of the frame as "ON". That is, in a case where three points (PC1, PC2, and PC3) are moving as illustrated in FIG. 18, the continuity states of the frames illustrated in FIGS. 18A and 18G are stored as "OFF", and the continuity states of the frames illustrated in FIGS. 18B to 18F are stored as "ON".

Therefore, the continuity state of the immediately previous frame (FIG. 18A) of the frame (FIG. 18B) in which the foremost point PC1 among the three points has reached the continuity determination region AC is "OFF". On the other hand, the continuity state of the immediately previous frame (FIG. 18B) of the frame (FIG. 18C) in which the point PC2 that is not the foremost point among the three points has reached the continuity determination region AC is "ON". Therefore, it is possible to check whether or not a point is the foremost point among continuous points by checking the continuity state of the immediately previous frame of a frame in which each point has reached the continuity determination region AC. Therefore, the continuity determination unit 225 can determine whether or not each point of the first point cloud information is continuous to another point.

In the present embodiment, if the continuity determination unit 225 determines that points of two point clouds (segments) estimated by the segmentation unit 221 to correspond to different moving bodies are continuous, the front end position estimation unit 223 determines that the two point clouds (segments) are point clouds corresponding to the same vehicle. For example, when the estimated front end position has reached the continuity determination region AC, the front end position estimation unit 223 checks the continuity state of the immediately previous frame of a frame in which the estimated front end position has reached the continuity determination region AC, and if the continuity state is "ON", the front end position estimation unit 223 determines that a segment corresponding to the estimated front end position corresponds to the same vehicle to which a segment in front of the segment corresponds.

Then, the velocity calculation unit 224 calculates only one velocity for two segments determined to correspond to the same vehicle by the front end position estimation unit 223. That is, when the estimated front end position has reached the velocity calculation region AV, if a segment corresponding to the estimated front end position is the foremost segment among a plurality of segments determined to correspond to the same vehicle by the front end position estimation unit 223, the velocity calculation unit 224 calculates the velocity of the vehicle. On the other hand, when the estimated front end position has reached the velocity calculation region AV, if a segment corresponding to the estimated front end position is not the foremost segment among a plurality of segments determined to correspond to the same vehicle by the front end position estimation unit 223, the velocity calculation unit 224 does not calculate the velocity of the vehicle for the segment. By doing so, even in a case where one vehicle is separated into two segments by the segmentation unit 221, it is possible to prevent the velocity of the vehicle from being calculated for each segment. Alternatively, in the Kalman filter processing described above, since the movement velocity is also calculated at the same time as the estimation of the front end position, the velocity calculation unit 224 may select the movement velocity calculated by the Kalman filter.

At this time, the velocity calculation region AV and the continuity region AC may be set in such a way that a lower limit yAVL of the velocity calculation region AV and a lower limit yACL of the continuity determination region AC are the same. By doing so, when the estimated front end position becomes yAVL or more, the estimated front end position becomes yACL or more at the same time, and a timing of determining the continuity of the estimated front end position and a timing of calculating the velocity of the vehicle corresponding to the estimated front end position can be made the same.

A width yACH−yACL of the continuity determination region AC in the y-axis direction is set to be smaller than an inter-vehicle distance of vehicles traveling on the roadway RW. By doing so, the continuity determination region AC does not include two vehicles. Therefore, in the present embodiment, all points in the continuity determination region AC are points corresponding to one vehicle. As a result, in the present embodiment, the continuity determination unit 225 checks a temporal change of a point cloud included in the continuity determination region AC, and as long as a state in which a point is included in the continuity determination region AC continues, it is possible to determine that one vehicle is passing through the continuity determination region AC, and that points included in the continuity determination region AC during this period are points corresponding to one vehicle. A vehicle that is traveling generally has an inter-vehicle distance of 10 m or more. Therefore, the width yACH−yACL of the continuity determination region AC in the y-axis direction may be set to a value smaller than 10 m, for example, 3 m.

The number of point clouds corresponding to the vehicle AM measured when the vehicle AM is near the LiDAR 100 is larger than the number of point clouds corresponding to the vehicle AM measured when the vehicle AM is far from the LiDAR 100. Therefore, the continuity determination region AC may be located in the vicinity of the LiDAR 100. By doing so, a distance between points corresponding to the same vehicle AM is reduced, and the continuity of a point cloud can be determined more accurately.

Figure 19:
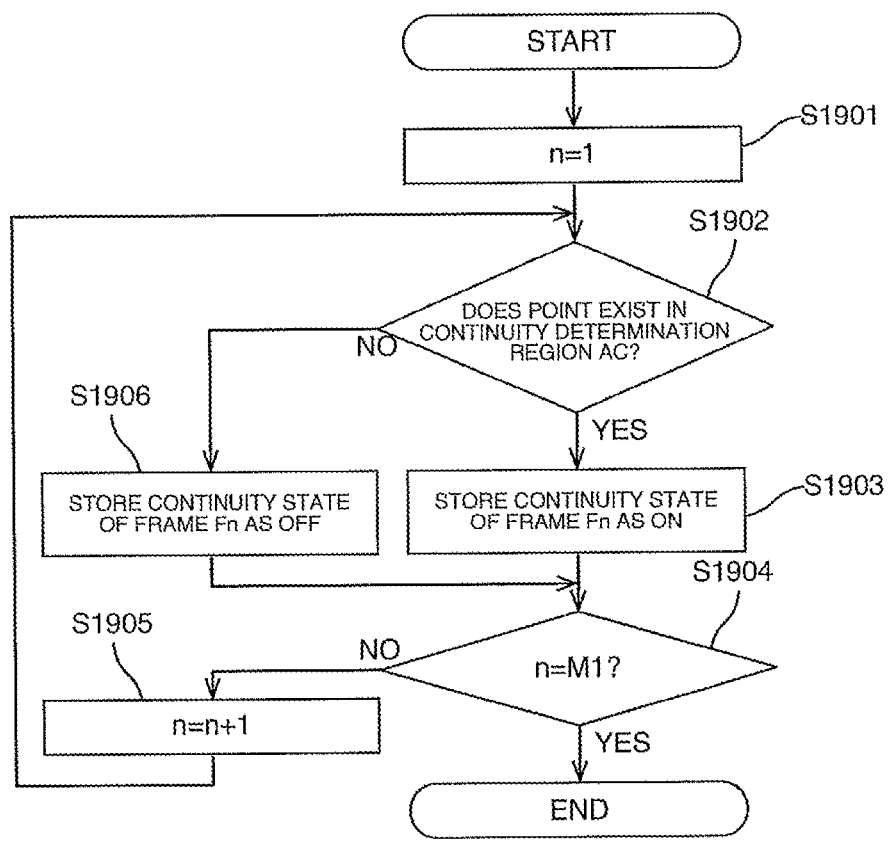
FIG. 19 is a diagram illustrating an example of a processing operation in a continuity determination unit 225 according to an embodiment of the present invention.

FIG. 19 is a diagram illustrating an example of a processing operation in the continuity determination unit 225 according to the present embodiment. In FIG. 19, it is assumed that the first point cloud information includes M1 frames Fn (n=1, 2, 3, ..., M1). The continuity determination unit 225 sets n=1 (Step S1901). The continuity determination unit 225 checks whether or not a point exists in the continuity determination region AC (Step S1902). If a point exists in the continuity determination region AC (YES in Step S1902), the continuity state of the frame Fn is stored as "ON" (Step S1903), and it is checked whether or not n=M1 (Step S1904). If n=M1 (YES in Step S1904), the continuity determination unit 225 ends the processing. If n is not M1 (NO in Step S1904), the vehicle velocity calculation unit 220 sets n=n+1 (Step S1905), and the processing returns to Step S1902.

If no point exists in the continuity determination region AC (NO in Step S1902), the continuity state of the frame Fn is stored as "OFF" (Step S1906), and it is checked whether or not n=M1 (Step S1904).

Figure 20:
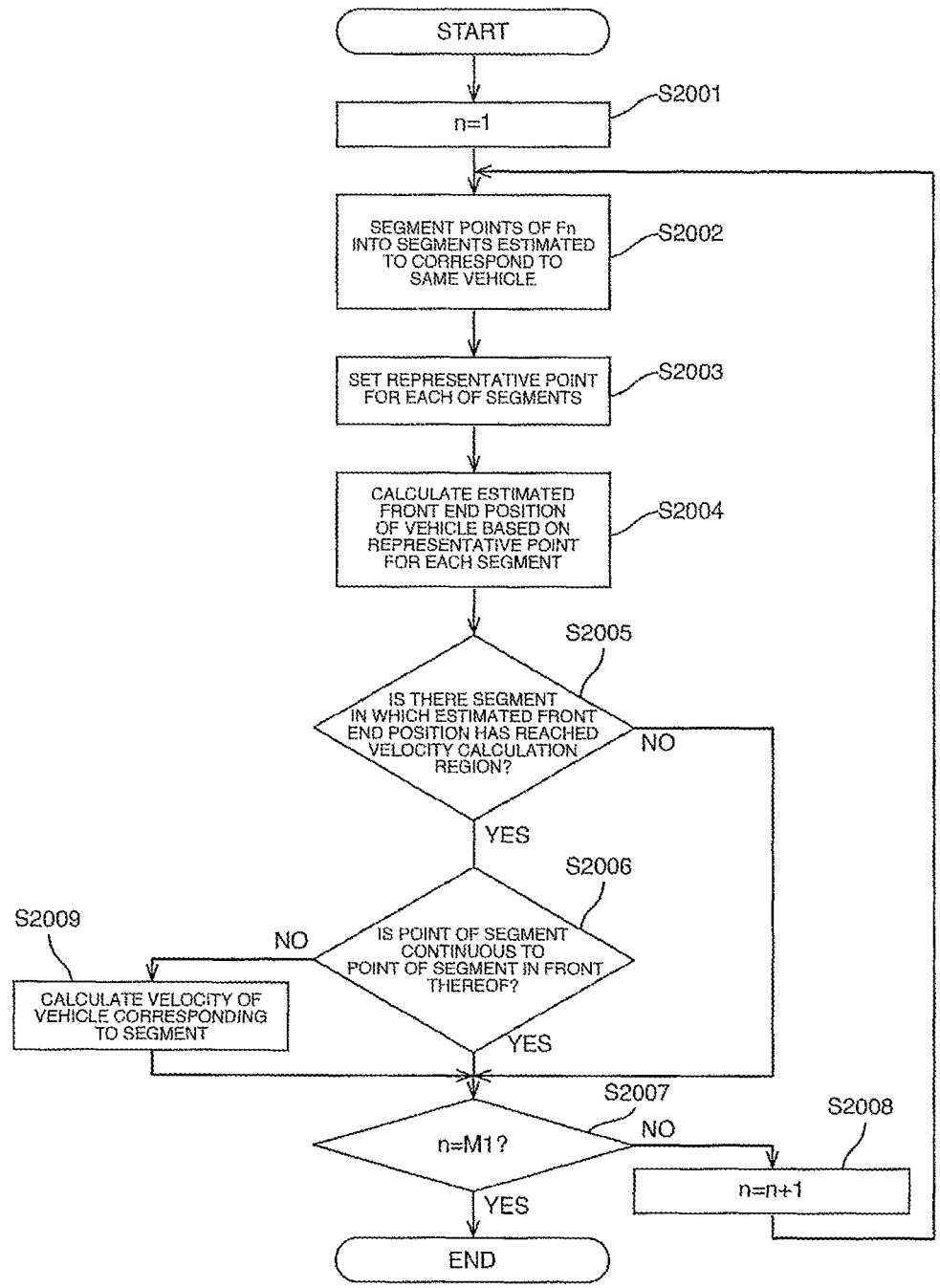
FIG. 20 is a diagram illustrating an example of a processing operation in the vehicle velocity calculation unit 220 according to an embodiment of the present invention.

FIG. 20 is a diagram illustrating an example of a processing operation in the vehicle velocity calculation unit 220 according to the present embodiment. In FIG. 20, it is assumed that the first point cloud information includes M1 frames Fn (n=1, 2, 3, ..., M1). The vehicle velocity calculation unit 220 sets n=1 (Step S2001). The segmentation unit 221 segments points of the frame Fn into segments of point clouds estimated to correspond to the same vehicle (Step S2002). The representative point setting unit 222 sets the representative point for each of the segments of the point clouds estimated to correspond to the same vehicle (Step S2003). For each of the segments of the point clouds estimated to correspond to the same vehicle, the front end position movement estimation unit 223 calculates the estimated front end position which is an estimated value of the front end position of the vehicle corresponding based on the set representative point (Step S2004).

If there is a segment in which the estimated front end position has reached the velocity calculation region AV in the frame Fn (YES in Step S2005), the front end position movement estimation unit 223 checks whether or not the continuity determination unit 225 has determined that a point of the segment corresponding to the estimated front end position is continuous to a point of a segment in front of the segment (Step S2006). If it is determined that the segments are not continuous (NO in Step S2006), the velocity calculation unit 224 calculates the velocity of the vehicle corresponding to this segment (Step S2009). If it is determined that the segments are continuous (YES in Step S2006), the front end position movement estimation unit 223 determines that this segment corresponds to the same vehicle as the vehicle to which the segment in front of this segment corresponds, and the velocity calculation unit 224 does not calculate the velocity of the vehicle.

If there is no segment in which the estimated front end position has reached the velocity calculation region AV in the frame Fn (NO in Step S2005), the vehicle velocity calculation unit 220 checks whether or not n=M1 (Step S2007).

The vehicle velocity calculation unit 220 checks whether or not n=M1 (Step S2007). If n=M1 (YES in Step S2007), the vehicle velocity calculation unit 220 ends the processing. If n is not M1 (NO in Step S2007), the vehicle velocity calculation unit 220 sets n=n+1 (Step S2008), and the processing returns to Step S2002.

<Time Correction for Representative Point>

Figure 21:
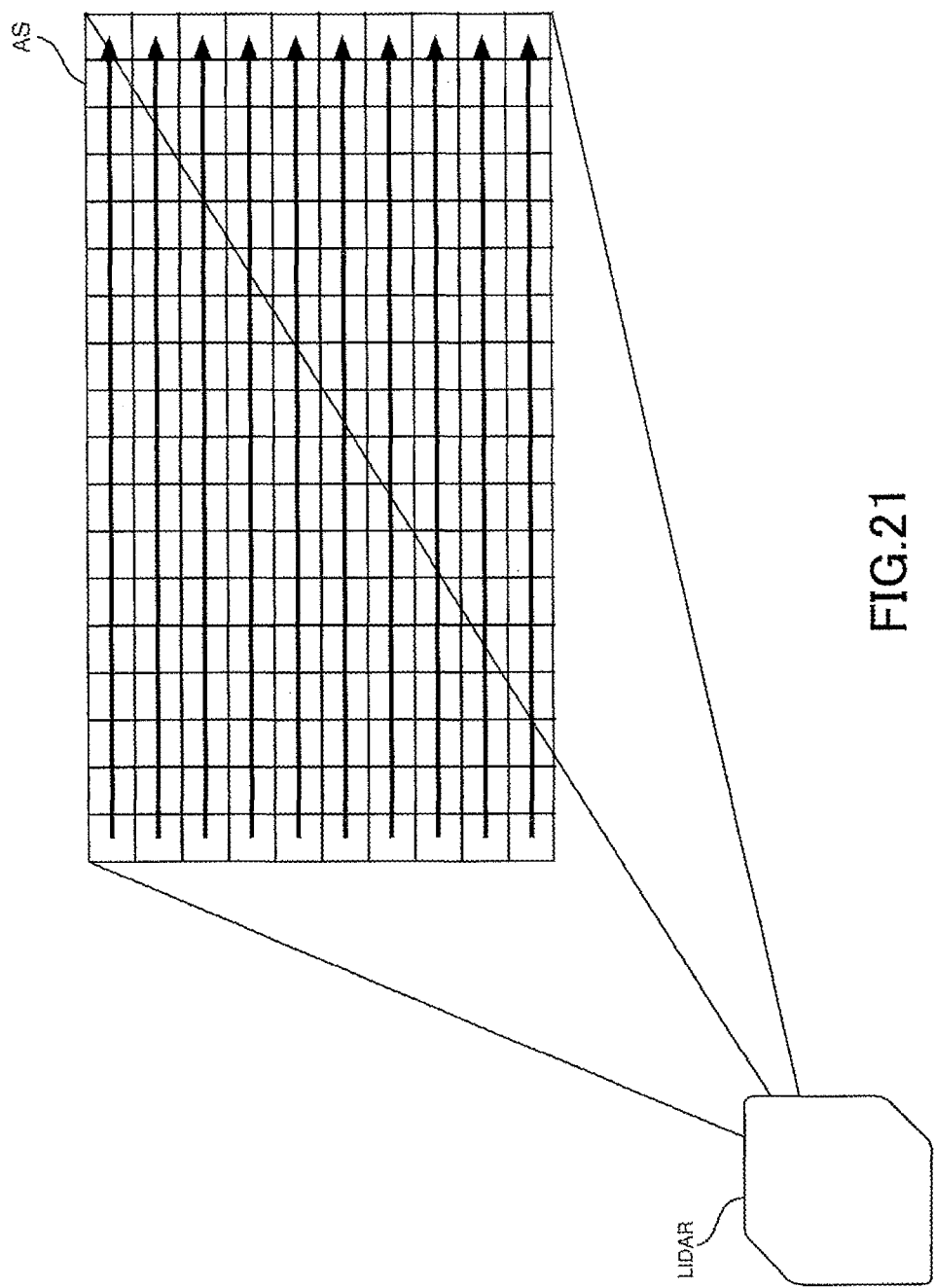
FIG. 21 is a diagram for describing scanning by LiDAR.

As illustrated in FIG. 21, in a case of LiDAR that generates data of one frame by performing scanning downward (or upward), there is a difference between a time at which each of scanning layers is actually scanned and a time of a time stamp of the frame. In the example illustrated in FIG. 21, scanning from left to right is performed 10 times in order to scan an entire range AS. For example, in a case where a time at which scanning is started is used as the time stamp of each frame, a difference between the time stamp of each frame and a time at which the n-th layer is scanned is (n−1)TS/10, in which TS represents a time required to scan the entire range AS.

Therefore, in a case where the velocity of the vehicle is calculated based on the data generated by such LiDAR, it is possible to calculate a more accurate velocity by considering this time difference. For example, in a case where the time at which scanning is started is used as the time stamp of each frame, the time at which the n-th layer is scanned is later than the time stamp of the frame. As a result, in a case where the time difference as described above is not taken into consideration, the calculated velocity of the vehicle is higher than the actual velocity of the vehicle. However, in the present embodiment, the representative point used for calculating the velocity of the vehicle is the average value of the y coordinates of the points in the front end portion region AT. Therefore, there is no information regarding in which scanning layer the representative point is included, and time correction in consideration of the time difference as described above cannot be performed.

Therefore, the vehicle velocity calculation unit 220 according to an embodiment of the present invention further includes a representative point scanning time estimation unit 226. The representative point scanning time estimation unit 226 uses the position of the representative point and a rule in which the position of the object on the roadway RW is associated with a time difference between the scanning time (time stamp) indicated by the time information and a time at which the object is scanned, in order to correct a scanning time (time stamp) indicated by time information, and estimates a time at which the representative point is scanned. Then, in the present embodiment, the front end position movement estimation unit 223 uses the time at which the representative point is estimated to be scanned by the representative point scanning time estimation unit 226, in order to calculate the estimated front end position which is an estimated value of the front end position of the vehicle. Furthermore, the velocity calculation unit 224 uses the time at which the representative point is estimated to be scanned by the representative point scanning time estimation unit 226, in order to calculate the velocity of the vehicle.

Figure 22:
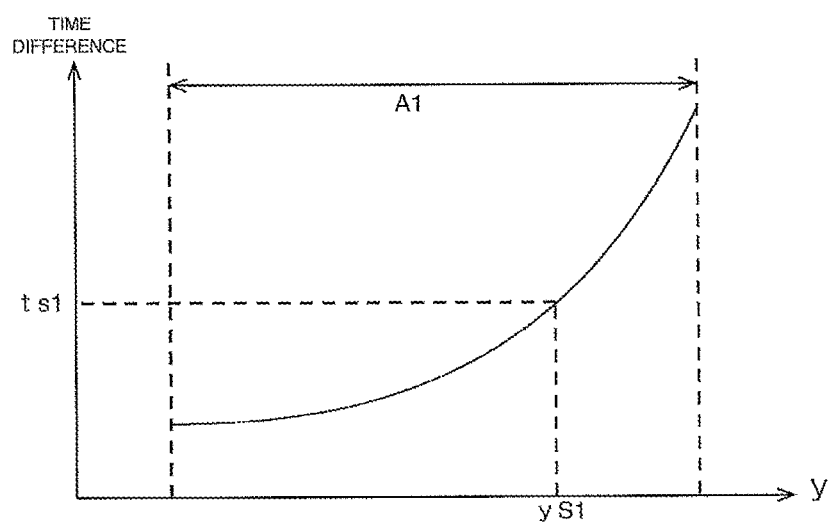
FIG. 22 is a diagram illustrating an example of a rule in which a position of an object on a roadway RW in the first region A1 is associated with a time difference between a scanning time (time stamp) indicated by time information and a time at which the object is scanned.

FIG. 22 is a diagram illustrating an example of a rule in which the position of the object on the roadway RW in the first region A1 is associated with the time difference between the scanning time (time stamp) indicated by the time information and the time at which the object is scanned. In FIG. 22, the horizontal axis represents the y-coordinate, and the vertical axis represents the time difference between the time stamp of the frame and the time at which the object is scanned. That is, in FIG. 22, the time difference between the time at which the object at y=ys1 is actually scanned and the time of the frame is ts1. This rule is obtained in advance by causing a vehicle to travel on the roadway RW and measuring the vehicle by the LiDAR 100, arranging a plurality of objects on a center line of the lane on the front side of the roadway RW and measuring the plurality of objects by the LiDAR 100, and the like.

The representative point scanning time estimation unit 226 estimates the time at which the representative point is scanned based on the value of the representative point set by the representative point setting unit 222 and the rule for each frame. For example, in a case where the time at which scanning is started is used as the time stamp of each frame, in the example illustrated in FIG. 22, if the representative point set by the representative point setting unit 222 in the frame Fn whose time stamp is TFn is ys1, the time at which the representative point is scanned is estimated to be TFn+ts1.

<Calculation of Front End Position>

For the vehicle AM of which the vehicle velocity VAM has been calculated by the vehicle velocity calculation unit 220, the front end position detection unit 230 calculates the front end position FE of the vehicle AM at the first time T1 based on the second point cloud information. It is considered that the vehicle AM whose velocity is the vehicle velocity VAM in the first region A1 reaches the second region A2 downstream of the first region A1 at substantially the same vehicle velocity as the vehicle velocity VAM. Therefore, the front end position detection unit 230 detects the front end position FE of the vehicle AM in a region (front end position detection region VFD) in which the front end position FE of the vehicle AM is predicted to be present based on the vehicle velocity VAM, in the second region A2.

Figure 23A:
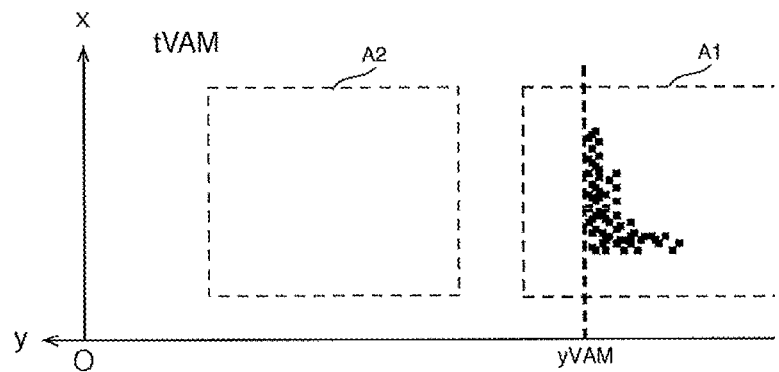
FIG. 23A is a diagram illustrating a relationship among a point cloud, a predicted front end position yFP, and a front end position detection region VFD.

First, for the vehicle AM of which the vehicle velocity VAM has been calculated by the vehicle velocity calculation unit 220, the front end position detection unit 230 calculates a y coordinate value (predicted front end position yFP) of a position where the front end position FE of the vehicle is predicted to be present. As described above, the velocity calculation unit 224 of the vehicle velocity calculation unit 220 calculates the velocity VAM of the vehicle AM when the estimated front end position has reached the velocity calculation region AV. Therefore, for example, the front end position detection unit 230 acquires a time tVAM at which the estimated front end position has reached the velocity calculation region AV, a value yVAM of the estimated front end position, and the vehicle velocity VAM. By doing so, for example, the front end position detection unit 230 can obtain the predicted front end position yFP at a time t by yFP=yVAM+VAM(t−tVAM) (FIG. 23).

Figure 23B:
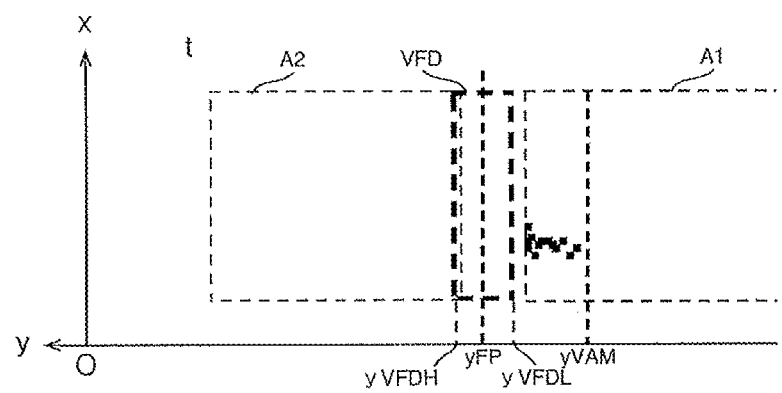
FIG. 23B is a diagram illustrating a relationship among a point cloud, a predicted front end position yFP, and a front end position detection region VFD.

Then, the front end position detection unit 230 sets a region including the predicted front end position yFP as the front end position detection region VFD. The front end position detection region VFD is set as a region determined by, for example, yVFDL≤y≤yVFDH. Since the front end position FE of the vehicle AM may be located in front of or behind the predicted front end position yFP, a lower limit yVFDL and an upper limit yVFDH of the y coordinate value of the front end position detection region VFD are set in such a way as to sandwich the predicted front end position yFP as illustrated in FIG. 23B (yVFDL<yFP<yVFDH).

Figure 24:
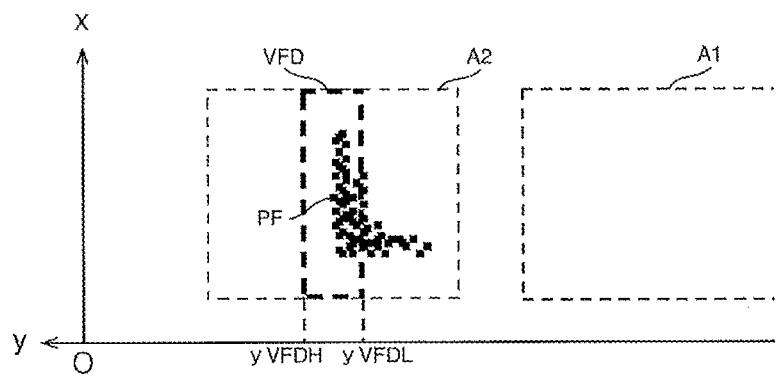
FIG. 24 is a diagram illustrating a relationship between a point cloud and the front end position detection region VFD.

Then, when the upper limit yVFDH of the front end position detection region VFD is in the second region A2 (FIG. 24), the front end position detection unit 230 detects the foremost point PF (a point having the largest y coordinate) from a point cloud in the front end position detection region VFD. At this time, the front end position detection unit 230 may detect the foremost point PF in all the frames in which the upper limit yVFDH of the front end position detection region VFD is in the second region A2, or may detect the foremost point PF in some of the frames in which the upper limit yVFDH of the front end position detection region VFD is in the second region A2.

In a case where the number of frames used to detect the foremost point PF is M2, the front end position detection unit 230 detects M2 foremost points PFn (1, . . . , and M2). The front end position detection unit 230 calculates, as the front end position FE, an average (yPFn+ . . . +yPFM2)/M2 of y coordinate values yPFn of the M2 foremost points PFn. In addition, the front end position detection unit 230 calculates, as the first time T1, an average (TF1+ . . . +TFM2)/M2 of time stamps TFn of M2 frames Fn in which the foremost points PFn are detected.

Figure 25:
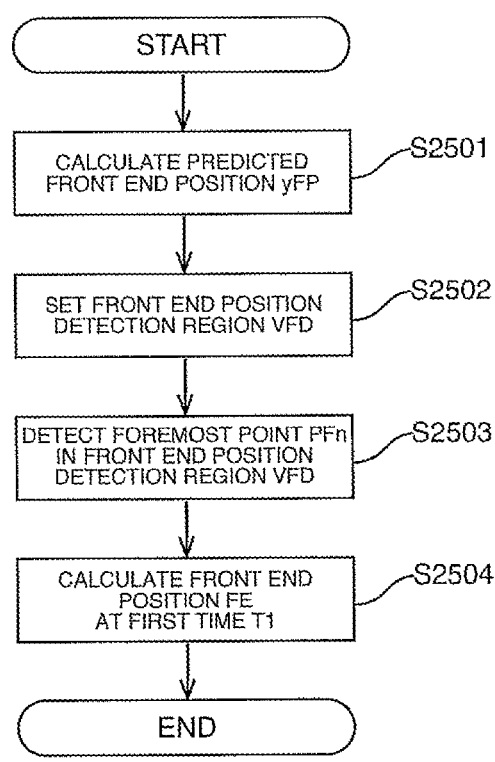
FIG. 25 is a diagram illustrating an example of a processing operation in a front end position detection unit 230 according to an embodiment of the present invention.

FIG. 25 is a diagram illustrating an example of a processing operation in the front end position detection unit 230 according to the present embodiment. The front end position detection unit 230 calculates the predicted front end position yFP for the vehicle AM of which the vehicle velocity VAM has been calculated by the vehicle velocity calculation unit 220 (Step S2501). The front end position detection unit 230 sets a region including the predicted front end position yFP as the front end position detection region VFD (Step S2502). The front end position detection unit 230 detects the foremost points PFn from a point cloud in the front end position detection region VFD for the frames Fn in which the upper limit yVFDH of the front end position detection region VFD is in the second region A2 (Step S2503). The front end position detection unit 230 calculates the front end position FE of the vehicle AM at the first time T1 based on the detected foremost points PFn and the time stamps TFn of the frames Fn in which the foremost points PFn are detected (Step S2504).

<Calculation of Rear End Position>

For the vehicle AM of which the vehicle velocity VAM has been calculated by the vehicle velocity calculation unit 220, the rear end position detection unit 240 calculates the rear end position RE at the second time T2 based on the third point cloud information. It is considered that the vehicle AM whose velocity is the vehicle velocity VAM in the first region A1 reaches the third region A3 downstream of the first region A1 at substantially the same vehicle velocity as the vehicle velocity VAM. Therefore, the rear end position detection unit 240 detects the rear end position RE of the vehicle AM in a region (rear end position detection region VRD) in which the rear end position RE of the vehicle AM is predicted to be present based on the vehicle velocity VAM.

Similarly to the front end position detection unit 230, the rear end position detection unit 240 also calculates the y coordinate value (predicted front end position yPF) of the position where the front end position FE of the vehicle AM of which the vehicle velocity VAM has been calculated by the vehicle velocity calculation unit 220 is predicted to be present. Then, the rear end position detection unit 240 sets, as a position (predicted rear end position yPR) where the rear end position RE is predicted to be present, a y coordinate value of a position located behind the position where the front end position FE of the vehicle AM is predicted to be present, by an interval corresponding to an estimated vehicle length (estimated moving body length) LE. That is, the predicted rear end position yPR is yPR=yPF−LE. Here, the estimated vehicle LE is an estimated value of the length of the vehicle AM, and a typical vehicle length may be used as the estimated vehicle LE. Alternatively, the estimated vehicle LE may be calculated based on the first point cloud information as described in detail below.

Figure 26:
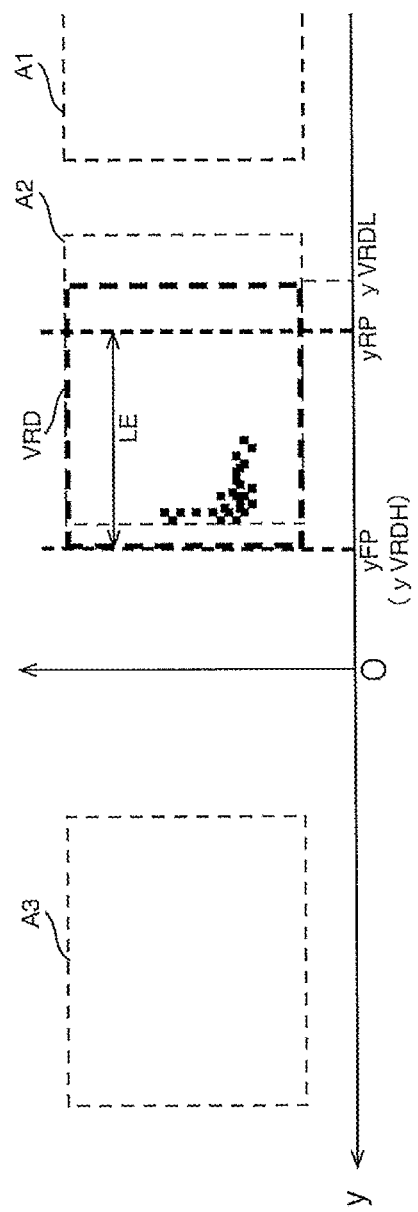
FIG. 26 is a diagram illustrating a relationship among a point cloud, a predicted rear end position yRP, and a rear end position detection region VRD.

Then, the rear end position detection unit 240 sets a region including the predicted rear end position yRP as the rear end position detection region VRD. The rear end position detection region VRD is set as a region determined by, for example, yVRDL≤y≤yVRDH. Since the rear end position RE of the vehicle AM may be located in front of or behind the predicted rear end position yRP, a lower limit yVRDL and an upper limit yVRDH of the rear end position detection region VRD are arranged in such a way as to sandwich the predicted rear end position yRP as illustrated in FIG. 26 (yVRDL<yRP<yVRDH). In the example illustrated in FIG. 26, the upper limit yVRDH of the rear end position detection region VRD is set at the same position as the predicted front end position yFP, but the upper limit yVRDH may also be set behind the predicted front end position yFP.

Figure 27:
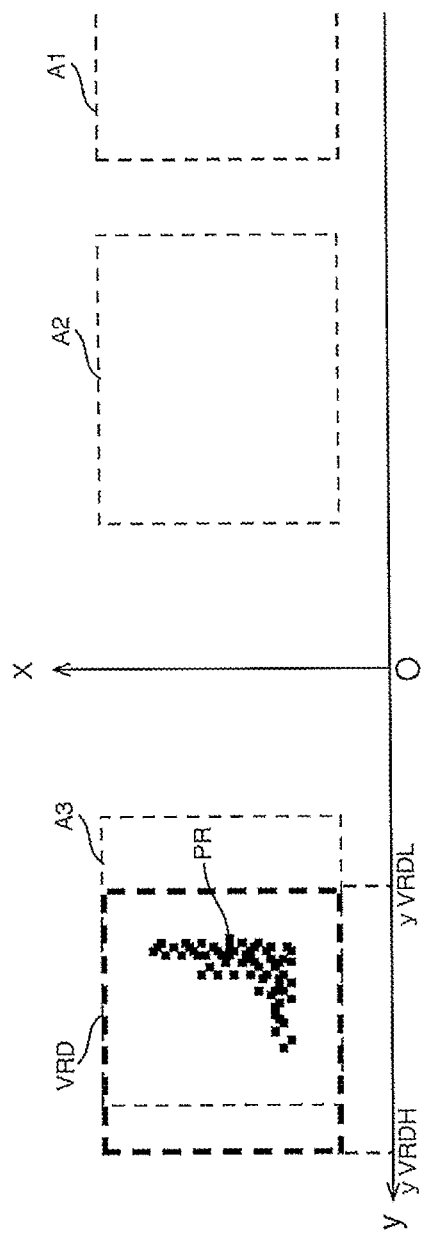
FIG. 27 is a diagram illustrating a relationship between a point cloud and the rear end position detection region VRD.

Then, when the lower limit yVRDL of the rear end position detection region VRD is in the third region A3 (FIG. 27), the rear end position detection unit 240 detects the rearmost point PR (a point having the smallest y coordinate) from a point cloud in the rear end position detection region VRD. At this time, the rear end position detection unit 240 may detect the rearmost point PR in all the frames in which the lower limit yVRDL of the rear end position detection region VRD is in the third region A3, or may detect the rearmost point PR in some of the frames in which the lower limit yVRDL of the rear end position detection region VRD is in the third region A3.

In a case where the number of frames used to detect the rearmost point PR is M3, the rear end position detection unit 240 detects M3 rearmost points PRn (1, . . . , and M3). Then, the rear end position detection unit 240 calculates, as the rear end position RE, an average (yPRn+ . . . +yPRM3)/M3 of y coordinate values yPRn of the M3 rearmost points PRn. In addition, the rear end position detection unit 240 calculates, as the second time T2, an average (TF1+ . . . +TFM3)/M3 of time stamps TFn of M3 frames Fn in which the rearmost points PRn are detected.

Figure 28:
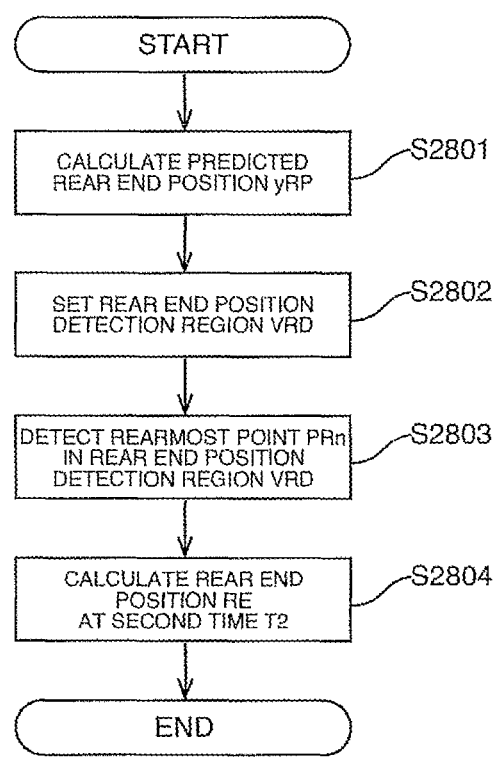
FIG. 28 is a diagram illustrating an example of a processing operation in a rear end position detection unit 240 according to an embodiment of the present invention.

FIG. 28 is a diagram illustrating an example of a processing operation in the rear end position detection unit 240 according to the present embodiment. The rear end position detection unit 240 calculates the predicted rear end position yRP for the vehicle AM of which the vehicle velocity VAM has been calculated by the vehicle velocity calculation unit 220 (Step S2801). The rear end position detection unit 240 sets a region including the predicted rear end position yRP as the rear end position detection region VRD (Step S2802). The rear end position detection unit 240 detects the rearmost points PRn from a point cloud in the rear end position detection region VRD for the frames Fn in which the lower limit yVRDL of the rear end position detection region VRD is in the third region A3 (Step S2803). The rear end position detection unit 240 calculates the rear end position RE of the vehicle AM at the second time T2 based on the detected rearmost points PRn and the time stamps TFn of the frames Fn in which the rearmost points PRn are detected (Step S2804).

<Estimated Vehicle Length>

For example, a typical vehicle length may be used as the estimated vehicle length LE. However, a two-wheeled vehicle and a semi-trailer are greatly different in vehicle length. Therefore, the vehicle velocity calculation unit 220 of the control unit 200 according to an embodiment of the present invention further includes an estimated vehicle length calculation unit 227 that calculates the estimated vehicle length LE, which is an estimated value of the vehicle length of the vehicle AM, based on the first point cloud information. Then, the rear end position detection unit 240 according to the present embodiment calculates the predicted rear end position yPR by using the estimated vehicle length LE calculated by the estimated vehicle length calculation unit 227.

The estimated vehicle length calculation unit 227 calculates the estimated vehicle length LE, which is an estimated value of the vehicle length of the vehicle AM, based on a temporal change of a point cloud included in the continuity determination region AC. Similarly to the continuity determination unit 225, the estimated vehicle length calculation unit 227 determines that a point cloud of the same vehicle is continuous as long as a point exists in the continuity determination region AC in the continuous frames. That is, the estimated vehicle length calculation unit 227 determines that the three points PC1, PC2, and PC3 in FIG. 18 are continuous.

Then, the estimated vehicle length calculation unit 227 calculates the estimated vehicle length LE by obtaining a distance between the foremost point and the rearmost point among the continuous points. In the example of FIG. 18, the distance between the point PC1 and the point PC3 is obtained. For example, if the velocity of the vehicle corresponding to the continuous points is VAM, the estimated vehicle length LE is obtained by LE=yE−yL+VAM(TFL−TFE), in which yE represents a y coordinate value of the foremost point in a frame FE when the foremost point among the continuous points is included in the continuity determination region AC, TFE represents a time stamp of the frame FE, yL represents a y coordinate value of the rearmost point in a frame FL when the rearmost point among the continuous points leaves the continuity determination region AC, and TFL represents a time stamp of the frame FL. The estimated vehicle length LE may be calculated as LE=AC (TFL−TFE) based on the width of AC and the time stamp.

The present invention has been described above with reference to preferred embodiments of the present invention. Although the present invention has been described with reference to specific examples, various modifications and changes can be made to these specific examples without departing from the spirit and scope of the present invention described in the claims.

REFERENCE SIGNS LIST

1000 LiDAR system
100 LiDAR
200 Control unit
210 Point cloud information acquisition unit
220 Vehicle velocity calculation unit
221 Segmentation unit
222 Representative point setting unit
223 Front end position movement estimation unit
224 Velocity calculation unit
225 Continuity determination unit
226 Representative point scanning time estimation unit
227 Estimated vehicle length calculation unit
230 Front end position detection unit
240 Rear end position detection unit
250 Vehicle length calculation unit

The invention claimed is:

1. An information processing device comprising:
a point cloud acquisition unit that acquires, in time series, first point cloud information based on three-dimensional point cloud information of a first region of a moving body path in which a movement direction is set, and second point cloud information based on three-dimensional point cloud information of a second region downstream of the first region;
a moving body velocity calculation unit that calculates a velocity of a moving body by estimating the movement of a front end position of the moving body based on a temporal change of the first point cloud information; and
a front end position calculation unit that estimates, from the point cloud in a region determined by the front end position estimated from the velocity of the moving body, the front end position in the second point cloud information to calculate a front end position of the moving body at a first time based on the temporal change of the estimated front end position in the second point cloud information.

2. An information processing method comprising:
a point cloud acquisition step of acquiring, in time series, first point cloud information based on three-dimensional point cloud information of a first region of a moving body path in which a movement direction is set, and second point cloud information based on three-dimensional point cloud information of a second region downstream of the first region;
a moving body velocity calculation step of calculating a velocity of a moving body by estimating the movement of a front end position of the moving body based on a temporal change of the first point cloud information;
a front end position calculation step of estimating, from the point cloud in a region determined by the front end position estimated from the velocity of the moving body, the front end position in the second point cloud information to calculate a front end position of the moving body at a first time based on the temporal change of the estimated front end position in the second point cloud information.

\* \* \* \* \*